(12) United States Patent
Tadokoro et al.

(10) Patent No.: US 11,059,912 B2
(45) Date of Patent: Jul. 13, 2021

(54) POLYMER PRODUCTION METHOD

(71) Applicant: Nissan Chemical Corporation, Tokyo (JP)

(72) Inventors: Shinsuke Tadokoro, Funabashi (JP); Masami Kozawa, Funabashi (JP)

(73) Assignee: NISSAN CHEMICAL CORPORATION, Tokyo (JP)

( * ) Notice: Subject to any disclaimer, the term of this patent is extended or adjusted under 35 U.S.C. 154(b) by 1 day.

(21) Appl. No.: 16/075,283

(22) PCT Filed: Feb. 3, 2017

(86) PCT No.: PCT/JP2017/003912
§ 371 (c)(1),
(2) Date: Aug. 3, 2018

(87) PCT Pub. No.: WO2017/135398
PCT Pub. Date: Aug. 10, 2017

(65) Prior Publication Data
US 2019/0062464 A1 Feb. 28, 2019

(30) Foreign Application Priority Data

Feb. 4, 2016 (JP) .............................. JP2016-019733

(51) Int. Cl.
C08F 2/01 (2006.01)
C08F 4/48 (2006.01)
(Continued)

(52) U.S. Cl.
CPC .............. C08F 2/01 (2013.01); B01F 5/0077 (2013.01); B01F 5/0609 (2013.01);
(Continued)

(58) Field of Classification Search
None
See application file for complete search history.

(56) References Cited

U.S. PATENT DOCUMENTS 4,965,327 A   10/1990  Stachowiak et al.
6,448,353 B1 *  9/2002  Nelson ..................... B01J 19/18
                                                    526/263
(Continued)

FOREIGN PATENT DOCUMENTS

EP       2511309 A1    1/2002
EP    1 263 794 A1   12/2002
(Continued)

OTHER PUBLICATIONS

International Search Report, issued in PCT/JP2017/003912, dated Apr. 4, 2017.
(Continued)

Primary Examiner — Richard A Huhn
(74) Attorney, Agent, or Firm — Birch, Stewart, Kolasch & Birch, LLP

(57) ABSTRACT

A polymer production method whereby: a flow reactor comprising a flow path wherein a plurality of liquids can be mixed is used; and a monomer is anionically polymerized in the presence of an initiator. The flow reactor comprises a mixer for mixing two liquids, said mixer comprising either a joint member having a double pipe therein or a static mixer member.

12 Claims, 13 Drawing Sheets

(51) Int. Cl.

| | | |
|---|---|---|
| *C08F 12/08* | (2006.01) | |
| *B01F 5/00* | (2006.01) | |
| *C08F 297/02* | (2006.01) | |
| *C08F 12/04* | (2006.01) | |
| *B01F 5/06* | (2006.01) | |
| *B01F 15/02* | (2006.01) | |
| *C08K 5/56* | (2006.01) | |
| *B01J 19/00* | (2006.01) | |

(52) U.S. Cl.
CPC ............ *B01F 15/0202* (2013.01); *C08F 4/48* (2013.01); *C08F 12/04* (2013.01); *C08F 297/02* (2013.01); *C08K 5/56* (2013.01); *B01F 2215/0036* (2013.01); *B01J 19/0053* (2013.01)

(56) References Cited

U.S. PATENT DOCUMENTS

| | | | |
|---|---|---|---|
| 2004/0156763 A1* | 8/2004 | Wood .................... | B01F 5/0618 422/600 |
| 2009/0253867 A1 | 10/2009 | Takahashi et al. | |
| 2010/0087605 A1 | 4/2010 | Yamamoto et al. | |
| 2016/0229943 A1 | 8/2016 | Uemura et al. | |

FOREIGN PATENT DOCUMENTS

| | | | |
|---|---|---|---|
| EP | 1 780 222 A1 | | 5/2007 |
| EP | 2447291 A1 | | 5/2012 |
| JP | 3-153702 A | | 7/1991 |
| JP | 6-32851 A | | 2/1994 |
| JP | 6-56910 A | | 3/1994 |
| JP | 2008-101203 A | | 5/2008 |
| JP | 2009-67999 A | | 4/2009 |
| JP | 5457027 B2 | | 4/2014 |
| JP | 2015-120642 A | | 7/2015 |
| JP | 2015120642 A | * | 7/2015 |
| JP | 2016-183217 A | | 10/2016 |
| WO | 02/02651 A1 | | 1/2002 |
| WO | WO 2015/041146 A1 | | 3/2015 |
| WO | WO 2015/046392 A1 | | 4/2015 |

OTHER PUBLICATIONS

Written Opinion of the International Searching Authority, issued in PCT/JP2017/003912, dated Apr. 4, 2017.
Communication Pursuant to Rule 164(1) EPC (partial supplementary European Search Report) dated Dec. 13, 2018, in European Patent Application No. 17747549.8.
Extended European Search Report for European Application No. 20156492.9, dated Jun. 24, 2020.

* cited by examiner

POLYMER PRODUCTION METHOD

TECHNICAL FIELD

The present invention relates to a polymer production method.

BACKGROUND ART

Flow chemistry, which continuously carries out chemical synthesis in a stream of flowing solution using a reaction apparatus referred to as a flow reactor or a microreactor, has been attracting attention in recent years. Compared with conventionally used batch processes, flow chemistry carries out reactions using a small reactor, and so advantages include the ability for precise temperature control and a good mixing efficiency.

In flow synthesis involving the mixture of two liquids, undissolved matter often settles out in the mixing section (mixer), blocking the flow channel and giving rise to pressure fluctuations, which makes long-term continuous operation impossible or causes the quality of the resulting synthesized product to be unstable. This problem is especially pronounced in reaction systems that use organolithium reagents, as in the anionic polymerization of polymers. Achieving both stable long-term continuous operation and highly efficient mixture is not easy.

PRIOR ART DOCUMENTS

Patent Documents

Patent Document 1: JP-A 2009-067999

SUMMARY OF INVENTION

Technical Problem

It is therefore an object of this invention to provide a method that is capable of stably producing polymer for a long period of time.

Solution to Problem

In the course of extensive investigations aimed at achieving the above object, the inventors have discovered that, by using a given flow reactor, polymer can be stably produced for a long period of time.

Accordingly, the invention provides the following polymer production method.

1. A polymer production method which includes the step of anionically polymerizing a monomer in the presence of an initiator by using a flow reactor having a flow channel capable of mixing a plurality of liquids, wherein the flow reactor is equipped with a mixer for mixing two liquids that includes a joint member having a double tube at the interior or a static mixer member.
2. The polymer production method of 1 above, wherein the static mixer member has a tubular body and an element body inserted at the interior of the tubular body.
3. The polymer production method of 1 or 2 above, wherein the mixer for mixing two liquids includes a joint member having a double tube at the interior and a static mixer member.
4. The polymer production method of 3 above, wherein the mixer for mixing two liquids includes a joint member having a double tube at the interior and a static mixer member;
   the static mixer member has a tubular body and an element body inserted at the interior of the tubular body; and
   the joint member and the static mixer member are connected in such manner that a double tube side endface of the tubular body is in touching contact with a static mixer member side endface of the double tube.
5. The polymer production method of 4 above, wherein the static mixer member side end of the double tube is situated at the interior of the joint member.
6. The polymer production method of any of 1 to 5 above, wherein the joint member has an insertion hole for inserting an inner tube through which flows an initiator solution and, in the inner tube-inserted state, the double tube is formed of, at least near a tip of the inner tube, the inner side of the inner tube and the space defined by an outer wall of the inner tube and an inner wall of the insertion hole.
7. The polymer production method of 6 above, wherein the joint member has a feed port for introducing a monomer solution, which feed port is connected to the insertion hole.
8. The polymer production method of 7 above, wherein the insertion hole is formed so as to have, in the vicinity of a connecting portion with the feed port, a diameter that is substantially the same as the inner tube outside diameter, and moreover is formed so as to have, from the place of connection to a tip of the inner tube, a diameter that is larger than the inner tube outside diameter.
9. The polymer production method of any of 6 to 8 above, wherein the joint member has a hole for connecting to the static mixer member and the feed port is connected to said connecting hole.
10. The polymer production method of any of 2 to 9 above, wherein the element body is inserted into the interior of the tubular body in such manner that one end thereof is substantially flush with the double tube side endface of the tubular body.
11. The polymer production method of any of 2 to 10 above, wherein the element body has a shape in which a plurality of right-handed twist blades and left-handed twist blades mutually overlap in a twist axis direction.
12. The polymer production method of any of claims 1 to 11 above, wherein the monomer is an aromatic vinyl compound.
13. The polymer production method of any of 1 to 12 above, wherein the initiator is an alkyllithium.
14. The polymer production method of any of 1 to 13 above, wherein the polymer has a dispersity of 1.5 or less.
15. A polymer containing structural units of formula (1) below

[Chem. 1]

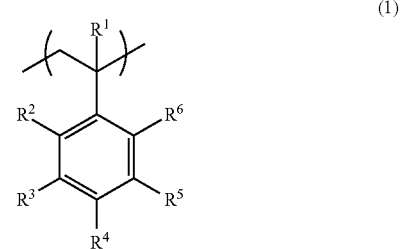

(wherein $R^1$ is a hydrogen atom or a methyl group; $R^2$ to $R^6$ are each independently a hydrogen atom, an alkoxy group of 1 to 5 carbon atoms, an alkyl group of 1 to 10 carbon atoms that may be substituted with a halogen atom, $-OSiR^7{}_3$ or $-SiR^7{}_3$; and each $R^7$ is independently an alkyl group of 1 to 10 carbon atoms, a phenyl group, an alkoxy group of 1 to 5 carbon atoms or an alkylsilyl group of 1 to 5 carbon atoms), wherein the polymer has an end that is an n-butyl group from an initiator residue, a weight-average molecular weight of from 1,000 to 50,000, and a dispersity is 1.5 or less.

16. The polymer of 14 above, wherein $R^4$ is an alkoxy group of 1 to 5 carbon atoms or $-SiR^7{}_3$.

17. The polymer of 15 above, wherein $R^4$ is a methoxy group or $-Si(CH_3)_3$.

18. A block copolymer comprising a first polymer block containing structural units of formula (2) below and a second polymer block containing structural units of formula (3) below

[Chem. 2]

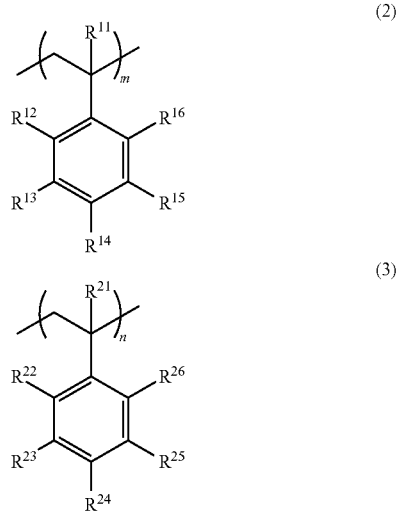

(wherein $R^{11}$ and $R^{21}$ are each independently a hydrogen atom or a methyl group; $R^{12}$ to $R^{16}$ are each independently a hydrogen atom, an alkoxy group of 1 to 5 carbon atoms or an alkyl group of 1 to 10 carbon atoms which may be substituted with a halogen atom; $R^{22}$ to $R^{26}$ are each independently a hydrogen atom, $-OSiR^{27}{}_3$ or $-SiR^{27}{}_3$; each $R^{27}$ is independently an alkyl group of 1 to 10 carbon atoms, a phenyl group, an alkoxy group of 1 to 5 carbon atoms or an alkylsilyl group of 1 to 5 carbon atoms; and m and n are each independently an integer from 1 to 480), wherein the structural units of formula (2) and the structural units of formula (3) are mutually differing structural units and the polymer has an end that is an n-butyl group from an initiator residue, a weight-average molecular weight (Mw) of from 1,000 to 50,000, and a dispersity of 1.5 or less.

19. The block copolymer of 18 above, wherein $R^{14}$ is an alkoxy group of 1 to 5 carbon atoms and $R^{24}$ is $-SiR^{27}{}_3$.

20. The block copolymer of 19 above, wherein $R^{14}$ is a methoxy group and $R^{24}$ is $-Si(CH_3)_3$.

Advantageous Effects of Invention

Because the mixer for mixing two liquids used in this flow reactor does not readily clog and moreover has a good mixing efficiency, it is possible to stably produce polymer over a long period of time by the polymer production method of the invention using this mixer. In particular, block copolymers obtained by the production method of the invention have a small dispersity Mw/Mn (meaning the molecular weight distribution is narrow) and the structure can be controlled to a high degree, making such polymers applicable to semiconductor lithography based on induced self-assembly as well as to nanopatterning technology, or applicable to the production of high-performance elastomers.

BRIEF DESCRIPTION OF THE DIAGRAMS

DESCRIPTION OF EMBODIMENTS

Figure 1:
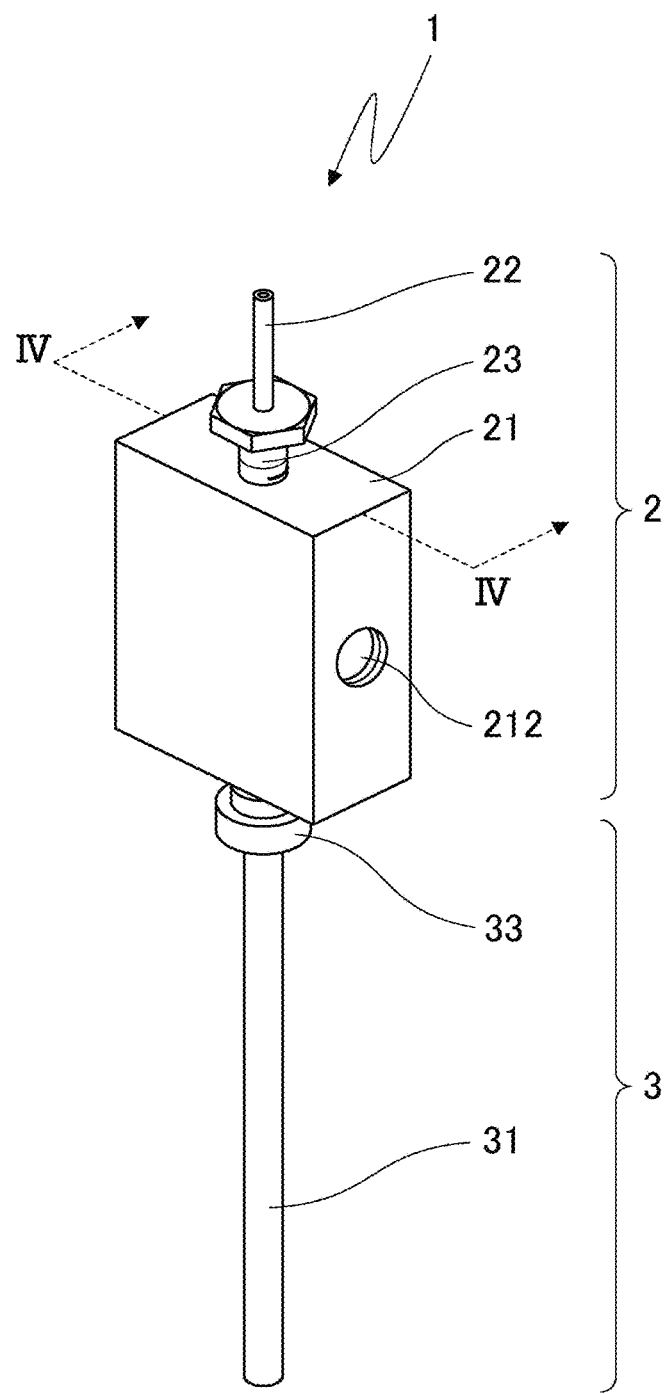
FIG. 1 is a perspective view showing an embodiment of the mixer for mixing two liquids that is used in the present invention.

The polymer production method of the invention uses a flow reactor having a flow channel which is capable of mixing together a plurality of liquids to anionically polymerize monomer in the presence of an initiator. The flow reactor is equipped with a mixer for mixing two liquids that has a double tube at the interior.

[Monomer]

The monomer used in the polymer production method of the invention is not particularly limited, so long as it is capable of anionic polymerization. Such monomers are exemplified by aromatic vinyl compounds, conjugated dienes and (meth)acrylic compounds.

Exemplary aromatic vinyl compounds include styrene derivatives of the following formula.

[Chem. 3]

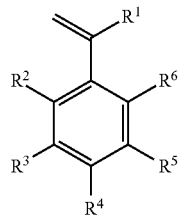

In the formula, $R^1$ is a hydrogen atom or a methyl group. $R^2$ to $R^6$ are each independently a hydrogen atom, an alkoxy group of 1 to 5 carbon atoms, an alkyl group of 1 to 10 carbon atoms which may be substituted with a halogen atom, $-OSiR^7{}_3$ or $-SiR^7{}_3$. Each $R^7$ is independently an alkyl group of 1 to 10 carbon atoms, a phenyl group, an alkoxy group of 1 to 5 carbon atoms or an alkylsilyl group of 1 to 5 carbon atoms.

The alkyl group may be linear, branched or cyclic. Specific examples include methyl, ethyl, n-propyl, isopropyl, cyclopropyl, n-butyl, isobutyl, sec-butyl, tert-butyl, cyclobutyl, 1-methylcyclopropyl, 2-methylcyclopropyl, n-pentyl, n-hexyl, n-heptyl, n-octyl, n-nonyl, n-decyl, n-undecyl, n-dodecyl, n-tridecyl, n-tetradecyl, n-pentadecyl, 1-methyl-n-butyl, 2-methyl-n-butyl, 3-methyl-n-butyl, 1,1-dimethyl-n-propyl, 1,2-dimethyl-n-propyl, 2,2-dimethyl-n-propyl, 1-ethyl-n-propyl, cyclopentyl, 1-methylcyclobutyl, 2-methylcyclobutyl, 3-methylcyclobutyl, 1,2-dimethylcyclopropyl, 2,3-dimethylcyclopropyl, 1-ethylcyclopropyl, 2-ethylcyclopropyl, n-hexyl, 1-methyl-n-pentyl, 2-methyl-n-pentyl, 3-methyl-n-pentyl, 4-methyl-n-pentyl, 1,1-dimethyl-n-butyl, 1,2-dimethyl-n-butyl, 1,3-dimethyl-n-butyl, 2,2-dimethyl-n-butyl, 2,3-dimethyl-n-butyl, 3,3-dimethyl-n-butyl, 1-ethyl-n-butyl, 2-ethyl-n-butyl, 1,1,2-trimethyl-n-propyl, 1,2,2-trimethyl-n-propyl, 1-ethyl-1-methyl-n-propyl, 1-ethyl-2-methyl-n-propyl, cyclohexyl, 1-methylcyclopentyl, 2-methylcyclopentyl, 3-methylcyclopentyl, 1-ethylcyclobutyl, 2-ethylcyclobutyl, 3-ethylcyclobutyl, 1,2-dimethylcyclobutyl, 1,3-dimethylcyclobutyl, 2,2-dimethylcyclobutyl, 2,3-dimethylcyclobutyl, 2,4-dimethylcyclobutyl, 3,3-dimethylcyclobutyl, 1-n-propylcyclopropyl, 2-n-propylcyclopropyl, 1-isopropylcyclopropyl, 2-isopropylcyclopropyl, 1,2,2-trimethylcyclopropyl, 1,2,3-trimethylcyclopropyl, 2,2,3-trimethylcyclopropyl, 1-ethyl-2-methylcyclopropyl, 2-ethyl-1-methylcyclopropyl, 2-ethyl-2-methylcyclopropyl and 2-ethyl-3-methylcyclopropyl groups. Of these alkyl groups, ones having from 1 to 8 carbon atoms are preferred, ones having from 1 to 6 carbon atoms are more preferred, and ones having from 1 to 3 carbon atoms are even more preferred.

Specific examples of alkoxy groups include methoxy, ethoxy, n-propoxy, isopropoxy, cyclopropoxy, n-butoxy, isobutoxy, sec-butoxy, tert-butoxy, cyclobutoxy, 1-methylcyclopropoxy, 2-methylcyclopropoxy, n-pentyloxy, 1-methyl-n-butoxy, 2-methyl-n-butoxy, 3-methyl-n-butoxy, 1,1-dimethyl-n-propoxy, 1,2-dimethyl-n-propoxy, 2,2-dimethyl-n-propoxy, 1-ethyl-n-propoxy, 1,1-diethyl-n-propoxy, cyclopentoxy, 1-methylcyclobutoxy, 2-methylcyclobutoxy, 3-methylcyclobutoxy, 1,2-dimethylcyclopropoxy, 2,3-dimethylcyclopropoxy, 1-ethylcyclopropoxy and 2-ethylcyclopropoxy groups. The alkoxy group structure is preferably linear or branched. Of these, ones having from 1 to 3 carbon atoms are preferred.

Preferred halogen atoms are fluorine, chlorine, bromine and iodine atoms, with fluorine and chlorine atoms being more preferred.

$R^4$ is preferably an alkoxy group of 1 to 5 carbon atoms or $-SiR^7{}_3$, and more preferably a methoxy group or $-Si(CH_3)_3$. $R^2$, $R^3$, $R^5$ and $R^6$ are preferably hydrogen atoms, alkyl groups of 1 to 10 carbon atoms, alkoxy groups of 1 to 5 carbon atoms or $-SiR^7{}_3$, and are more preferably hydrogen atoms, methoxy groups or $-Si(CH_3)_3$.

Specific examples of the styrene derivatives include styrene, α-methylstyrene, 2-methylstyrene, 3-methylstyrene, 4-methylstyrene, 4-ethylstyrene, 2-ethylstyrene, 3-ethylstyrene, 4-tert-butylstyrene, 4-dimethylsilylstyrene, 4-trimethylsilylstyrene, 4-trimethylsilyloxystyrene, 4-dimethyl(tert-butyl)silylstyrene, 4-dimethyl(tert-butyl)silyloxystyrene, 2-methoxystyrene, 3-methoxystyrene, 4-methoxystyrene, 4-ethoxystyrene, 3,4-dimethylstyrene, 2,6-dimethylstyrene, 2,4-dimethoxystyrene, 3,4-dimethoxystyrene and 3,4,5-trimethoxystyrene.

Preferred use can be made of vinylnaphthalene, vinylanthracene, 2-vinylpyridine, 3-vinylpyridine and 4-vinylpyridine as the aromatic vinyl compound.

Examples of conjugated dienes include 1,3-butadiene, isoprene, 2,3-dimethyl-1,3-butadiene, 1,3-pentadiene, 1,3-heptadiene, 1,3-hexadiene and 1,3-cyclohexadiene.

Examples of the (meth)acrylic compounds include methyl (meth)acrylate, ethyl (meth)acrylate, n-propyl (meth)acrylate, isopropyl (meth)acrylate, n-butyl (meth)acrylate, isobutyl (meth)acrylate, sec-butyl (meth)acrylate, tert-butyl (meth)acrylate, n-pentyl (meth)acrylate, isopentyl (meth)acrylate, n-hexyl (meth)acrylate, cyclohexyl (meth)acrylate, n-octyl (meth)acrylate, 2-ethylhexyl (meth)acrylate, n-decyl (meth)acrylate, isodecyl (meth)acrylate, n-dodecyl (meth)acrylate, n-stearyl (meth)acrylate, isostearyl (meth)acrylate, phenyl (meth)acrylate, benzyl (meth)acrylate, naphthyl (meth)acrylate, anthryl (meth)acrylate, anthrylmethyl (meth)acrylate, 2-phenylethyl (meth)acrylate, 2-hydroxyethyl (meth)acrylate, 2-hydroxypropyl (meth)acrylate, 2,2,2-trifluoroethyl (meth)acrylate, 2,2,2-trichloroethyl (meth)acrylate, methoxydiethylene glycol (meth)acrylate, methoxypolyethylene glycol (meth)acrylate, tetrahydrofurfuryl (meth)acrylate, isobornyl (meth)acrylate, n-butoxyethyl (meth)acrylate, 3-chloro-2-hydroxypropyl (meth)acrylate, 2-methyl-2-adamantyl (meth)acrylate, 2-ethyl-2-adamantyl (meth)acrylate, 2-propyl-2-adamantyl (meth)acrylate, 2-methoxybutyl-2-adamantyl (meth)acrylate, 8-methyl-8-tricyclodecyl (meth)acrylate, 8-ethyl-8-tricyclodecyl (meth)acrylate, 5-methacryloyloxy-6-hydroxynorbornene-2-carboxylic-6-lactone and 2,2,3,3,4,4,4-heptafluorobutyl (meth)acrylate.

Of these, in terms of the ease of obtaining a monodisperse polymer even at a relatively high temperature, preferred monomers include aromatic vinyl compounds and tert-butyl (meth)acrylate.

[Initiator]

The initiator used in the polymer production method of the invention is not particularly limited, so long as it can normally be used in anionic polymerization. Exemplary initiators include organolithium compounds, Examples of organolithium compounds include monoorganolithium compounds such as methyllithium, ethyllithium, n-propyllithium, isopropyllithium, n-butyllithium, isobutyllithium, sec-butyllithium, tert-butyllithium, pentyllithium, hexyllithium, methoxymethyllithium, ethoxymethyllithium, phenyllithium, naphthyllithium, benzyllithium, phenylethyllithium, α-methylstyryllithium, 1,1-diphenylhexyllithium, 1,1-diphenyl-3-methylpentyllithium, 3-methyl-1,1-diphenylpentyllithium, vinyllithium, allyllithium, propenyllithium, butenyllithium, ethynyllithium, butynyllithium, pentynyllithium, hexynyllithium, 2-thienyllithium, 4-pyridyllithium and 2-quinolyllithium; and polyorganolithium compounds such as 1,4-dilithiobutane, 1,5-dilithiopentane, 1,6-dilithiohexane, 1,10-dilithiodecane, 1,1-dilithiodiphenylene, dilithiopolybutadiene, dilithiopolyisoprene, 1,4-dilithiobenzene, 1,2-dilithio-1,2-diphenylethane, 1,4-dilithio-2-ethylcyclohexane, 1,3,5-trilithiobenzene and 1,3,5-trilithio-2,4,6-triethylbenzene. Of these, monoorganolithium compounds such as n-butyllithium, sec-butyllithium and tert-butyllithium are preferred.

[Flow Reactor]

The flow reactor is not particularly limited, so long as it is equipped with a mixer for mixing two liquids that has a double tube at the interior. However, a flow reactor of the following construction is preferred. That is, the mixer for mixing two liquids preferably includes a joint member having a double tube at the interior or a static mixer member. The mixer more preferably includes both a joint member having a double tube at the interior and a static mixer member. It is even more preferable for the static mixer member to have a tubular body and an element body inserted at the interior of the tubular body, and for the joint member and the static mixer member to be connected in such manner that a double tube side endface of the tubular member is in touching contact with a static mixer member side endface of the double tube.

By having the joint member and the static mixer member connected in such manner that the double tube side endface of the tubular body is in touching contact with the static mixer member side endface of the double tube, clogging does not readily arise and stable long-term continuous operation of the mixer for mixing two liquids is possible, even while maintaining a good mixing efficiency.

That is, given that the mixer has a construction in which the double tube and the tubular body of the static mixer are connected at the joint interior, touching contact between the respective endfaces can be more reliably carried out than in a conventional microreactor construction. As a result, because the two liquids that have flowed out of the double tube flow into the static mixer at substantially the same time as they flow out of the double tube, more reliable mixture of the two liquids is carried out at the time of reaction onset.

In the mixer for mixing two liquids, it is preferable for the static mixer member side end of the double tube to be situated at the interior of the joint member. This arrangement simplifies the double tube construction, as a result of which the joint member is easy to manufacture and the point of contact between the joint member and the static mixer member is easier to check.

In this mixer for mixing two liquids, it is preferable for the joint member to have an insertion hole for inserting an inner tube through which flows a first liquid and, in the inner tube inserted state, for the double tube to be formed of, at least near a tip of the inner tube, the inner side of the inner tube and the space defined by an outer wall of the inner tube and an inner wall of the insertion hole. With such an arrangement, the double tube has a simple construction, as a result of which production of the joint member is easy.

This insertion hole can be formed by machining or by using a mold having a mold half that corresponds to the insertion hole. At this time, so long as liquid tightness can be maintained, the inner tube may be fastened to the joint member main body while inserted in the insertion hole formed in the joint member or may be attached so as to be removable from the joint member main body, although it is preferably attached so as to be removable from the joint member main body. Giving the inner tube such a removable structure provides the advantages of facilitating cleaning of the double tube portion following use and also enabling replacement in the event that the inner tube is damaged, clogged or contaminated.

The inner tube fastening and attaching means is not particularly limited, provided that, as mentioned above, liquid tightness can be maintained. Examples include fastening with an adhesive, fastening by welding, and a removable attaching means that involves screw fastening or the like. The use of a removable attaching means that involves screw fastening or the like is preferred.

It is preferable for the joint member to have a feed port for introducing a second liquid and for this feed port to be connected to the insertion hole. This arrangement enables the double tube to be built at the interior of the joint member main body, as a result of which the length of the double tube can be shortened, facilitating manufacture of the joint member. As with the insertion hole, this feed port also can be formed by machining or by a technique that uses a mold.

The position where the feed port is formed in the joint member is not particularly limited, although the feed port is preferably formed in a direction orthogonal to the insertion hole. Moreover, from the standpoint of shortening the double tube length, it is preferable to form the feed port at a position which is closer to the far end of the insertion hole than the center point between the starting end and the far end thereof and at a position that can connect with the insertion hole.

In addition, the insertion hole is formed so as to have, in the vicinity of a connecting portion with the feed port, a diameter that is substantially the same as the inner tube outside diameter, and moreover is formed so as to have, from the place of connection to the tip of the inner tube, a diameter that is larger than the inner tube outside diameter. By adopting a hole construction having such differing diameters, substantially no gap forms between the inner tube and the insertion hole at the place of connection and so leakage to the starting end side of the insertion hole by the second liquid that flows in from the feed port can be prevented, enabling the two liquids to be mixed together efficiently.

It is preferable for the joint member to have a hole for connecting to the static mixer member and for the feed port to be connected to the connecting hole. This arrangement makes it possible to design the joint member and the static mixer member separately, which facilitates adjustment of the internal structure of the mixer for mixing two liquids. As with the feed port, this connecting hole also can be formed by machining or by a technique that uses a mold.

As with the above-described inner tube, this static mixer member, so long as liquid tightness can be maintained, may be fastened to the joint member main body while inserted into the connecting hole formed in the joint member or may be attached so as to be removable from the joint member main body, although it is preferably attached so as to be removable from the joint member main body. By making it removable, adjustment in the position of the element body at the interior of the static mixer member and cleaning of the mixer following use are simple, in addition to which, in the event of contamination or deterioration, replacement of the parts is possible. The static mixer member fastening and attaching means is exemplified in the same way as the means described for the inner tube. Here too, the use of a removable attaching means that involves screw fastening or the like is preferred.

In addition, it is preferable for the element body to be inserted into the interior of the tubular body in such manner that one end thereof is substantially flush with the double tube side endface of the tubular body. By thus having the tubular body endface and the end of the element body substantially coincide, the two liquids that have flowed out of the double tube flow into the element body and mix together at substantially the same time as they flow out of the double tube. Hence, more efficient mixing and agitation is carried out from the time of reaction onset.

The shape of the tubular body is not particularly limited. However, taking into consideration the flowability, mixing properties and the like of the two liquids that pass through the interior, a cylindrical shape is preferred.

The structure of the element body is not particularly limited; use may be made of an element body that is suitably selected from among those used as static mixer element bodies. Illustrative examples include an element body having a shape in which a plurality of right-handed twist blades and left-handed twist blades mutually overlap in the lengthwise direction (twist axis direction), an element body having a helical shape with a fixed direction of twist, and an element body in which are stacked a plurality of plates each provided with one, two or more holes. An element body having a shape in which a plurality of right-handed twist blades and left-handed twist blades mutually overlap in the twist axis direction is preferred. By using an element body having such a shape, more efficient mixture is possible and clogging of the mixer during the reaction is less likely to occur.

The element body may be given a removable structure that only inserts into the interior of the tubular body or may be given a non-removable structure that, once inserted, fastens to the tubular body, although a removable structure that only inserts is preferred. By adopting a removable structure, positioning of the element body at the interior of the tubular body and replacement of the element body are easy.

The diameter of the element body is not particularly limited, so long as the element body can be inserted into the interior of the tubular body. However, it is preferable for this diameter (maximum diameter) to be substantially the same as the inside diameter of the tubular body. In this way, even in cases where the element body is only inserted into the interior of the tubular body, the position of the element body can be prevented from varying in both the lengthwise and crosswise directions at the interior of the tubular body. Taking into account the intended use of the mixer for mixing two liquids, the diameter of the element body is preferably from about 1 mm to about 10 mm, more preferably from about 1.6 mm to about 8 mm, and even more preferably from about 2 mm to about 5 mm.

The length of the element body is not particularly limited, so long as it can be inserted into the interior of the tubular body, although the element body length is preferably set to about the same length as that of the tubular body. This facilitates alignment of the end of the element with the double tube side endface of the tubular body.

The flow reactor used in this invention is equipped with the above-described mixer for mixing two liquids. The flow reactor may be equipped with one such mixer or with two or more. In cases where it is equipped with two or more such mixers, multistage flow synthesis is possible. Because the mixer for mixing two liquids does not readily clog, pressure loss when flow synthesis is carried out using the flow reactor is low and stable, continuous operation over an extended period of time is possible, making this flow reactor suitable for large-volume synthesis.

In addition to the above-described mixer for mixing two liquids, the flow reactor used in this invention may be optionally equipped with various other members needed for the reaction, such as a fluid delivery pump, a flow channel-forming tube, and a temperature regulator for regulating the temperature.

The fluid delivery pump is not particularly limited. Use can be made of a commonly used pump such as a plunger pump, a syringe pump or a rotary pump.

The flow channel-forming tube material is not particularly limited, and may be a metal such as stainless steel, titanium, iron, copper, nickel or aluminum, or a resin such as polytetrafluoroethylene (PTFE), tetrafluoroethylene-hexafluoropropylene copolymer (FEP), perfluoroalkoxy resin (PFA), polyetheretherketone (PEEK) or polypropylene (PP).

The inside diameter of the flow channel-forming tube may be suitably set according to the intended object, within a range that does not detract from the advantageous effects of the invention, although in general the inside diameter is preferably from about 0.5 mm to about 10 mm, more preferably from about 0.7 mm to about 4 mm, and even more preferably from about 1 mm to about 2 mm. The length of the flow channel-forming tube may also be suitably set according to the intended object, within a range that does not detract from the advantageous effects of the invention, although in general the length is preferably from about 0.1 m to about 20 m, more preferably from about 0.2 m to about 10 m, and even more preferably from about 0.3 m to about 5 m.

The mixer for mixing two liquids and the flow reactor used in this invention are described more concretely below in conjunction with the diagrams. Referring to FIG. 1, a mixer 1 for mixing two liquids is composed of a joint member 2 and a static mixer member 3. The joint member 2 has a stainless steel main body 21 and a stainless steel inner tube 22 (outside diameter, 1.6 mm; inside diameter, 1.0 mm) through which a first liquid flows.

Figure 2:
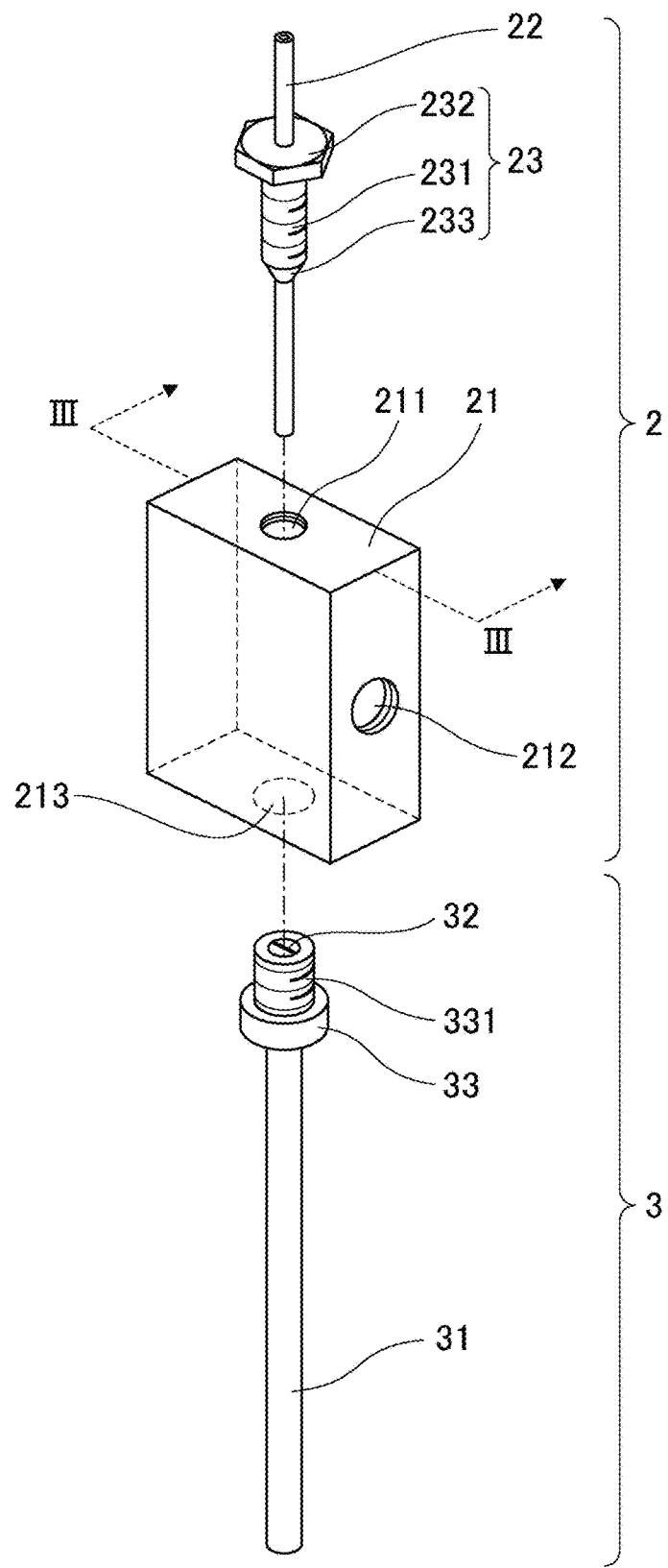
FIG. 2 is an exploded perspective view of the mixer in FIG. 1.
Figure 3:
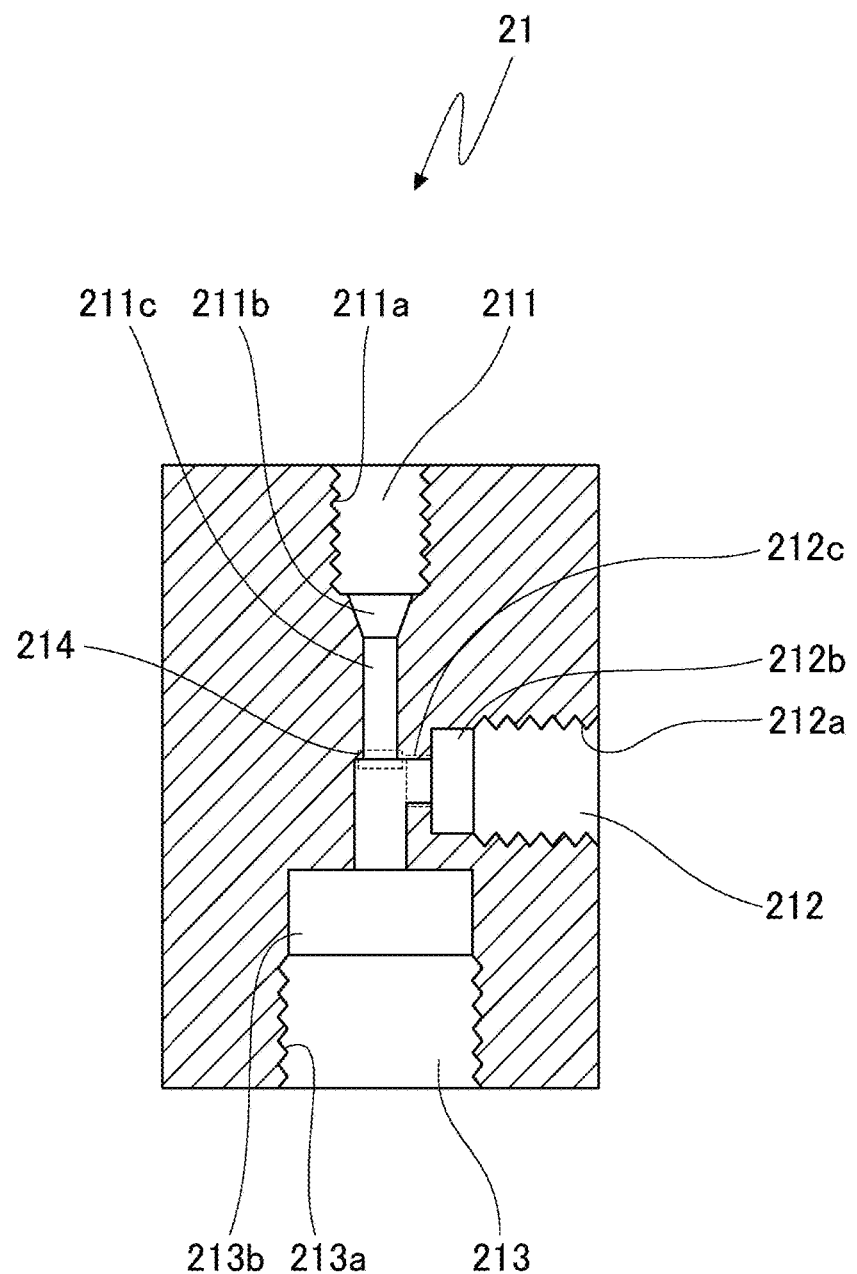
FIG. 3 is a sectional view of the main body taken along line III-III in FIG. 2.

As shown in FIGS. 2 and 3, the main body 21 has an insertion hole 211 for inserting an inner tube 22, a feed port 212 for introducing a second liquid which is orthogonal thereto and connects to the insertion hole 211 at the interior of the main body 21, and a static mixer member-connecting hole 213. Female threaded portions 211a, 212a and 213a corresponding to male threaded portions formed in the respective subsequently described connectors are formed on the inside walls of the insertion hole 211, the feed port 212 and the connecting hole 213 so as to enable the inner tube 22, a feed tube through which flows a second liquid, and the static mixer member 3 to be attached to the main body 21 by screw fastening.

The insertion hole 211 is composed of, from a starting end side to a far end side thereof: a female threaded portion 211a, a liquid-tight portion 211b that is formed continuous therewith and has a trapezoidal cross-sectional shape of reducing diameter which corresponds to the shape at the tip of the subsequently described connector, and an inner tube passage 211c that is formed continuous therewith. Here, referring to FIG. 5, the inner tube passage 211c of the insertion hole 211 has an inside diameter b that is shaped so as to be substantially the same as the outside diameter a of the inner tube 22 in the vicinity of a connecting portion 214 with the feed port 212, and the inner tube passage 211c from the connecting portion 214 to the connecting hole 213 has an inside diameter c that is shaped so as to be larger than the outside diameter a of the inner tube 22. In this way, there is provided a structure where, at the connecting portion 214, substantially no gap forms between the inner tube 22 and the insertion hole 211, thus preventing leakage to the starting end side of the insertion hole 211 by the second liquid that flows in from the feed port 212. Together with this, referring to FIG. 6, a double tube 25 is formed by an inner side 221 of the inner tube 22 and a space 24 defined by an outer wall 222 of the inner tube 22 and an inner wall 211d of the insertion hole 211.

Also, as shown in FIG. 3, the insertion hole 211 is connected at the starting end thereof to connecting hole 213. A hole formed of the insertion hole 211 and the connecting hole 213 thus passes entirely through the main body 21.

Referring to FIG. 2, the inner tube 22 has attached thereto a connector 23 having a substantially hexagonal columnar head 232 at the interior of which is formed a hole (not shown) through which passes the inner tube 22 and which is for screwing, and also, formed integrally therewith, a male threaded portion 231 and a seal 233 in the shape of an inverted truncated cone for maintaining liquid tightness at the interior of the joint main body 21. The inner tube 22 is inserted in this state into the insertion hole 211 having the female threaded portion 211a, and is attached to the main body 21 by screw fastening.

As shown in FIG. 3, the feed port 212 is composed of, from a starting end side to a far end side thereof, a female threaded portion 212a, a cross-sectionally rectangular liquid-tight portion 212b corresponding to the tip shape of the subsequently described connector, and a coupling portion 212c that extends from there to the connecting portion 214 with the insertion hole 211. The insertion hole 211 and the feed port 212 are connected on the far end side from the midpoint between the starting end and the far end of the insertion hole 211.

As shown in FIG. 3, the static mixer connecting hole 213 is composed of, from a starting end to a far end thereof, a female threaded portion 213a and a cross-sectionally rectangular liquid-tight portion 213b corresponding to the tip shape of the subsequently described connector.

Figure 4:
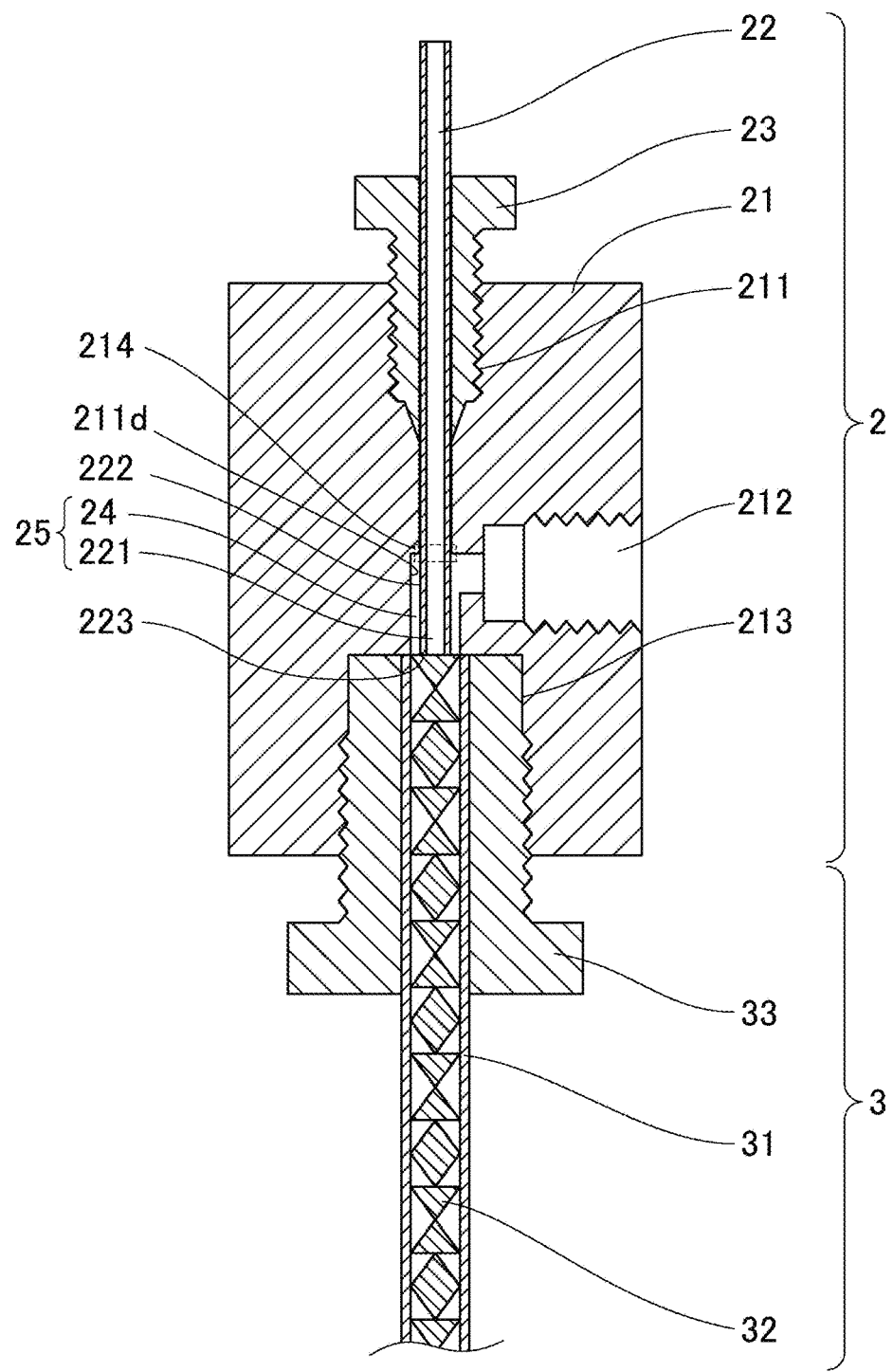
FIG. 4 is a sectional view along line IV-IV in FIG. 1
Figure 7:
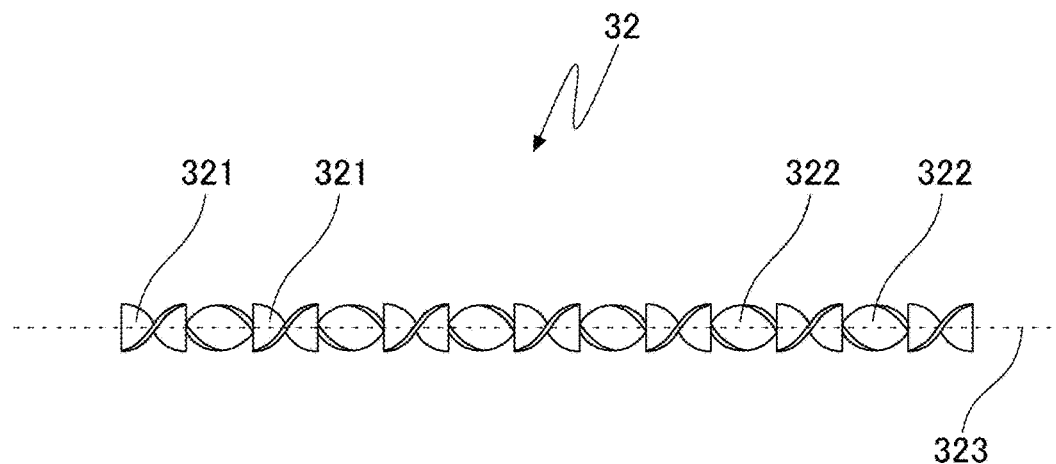
FIG. 7 is a view of the element body of the static mixer member, as seen from a direction perpendicular to the twist axis direction.

Referring to FIGS. 1 and 2, the static mixer member 3 is equipped with a cylindrical tubular body 31 (inside diameter, 3.0 mm) made of fluoroplastic or stainless steel, and an element body 32 (3 mm diameter) made of polyacetal that is inserted at the interior thereof. As shown in FIGS. 2 and 4, the element body 32 is inserted into the interior of the tubular body 31 in a state such that the starting end thereof becomes flush with the endface of the tubular body 31 on the double tube 25 side thereof. Here, as shown in FIG. 7, the element body 32 has a shape in which a plurality of right-handed twist blades 321 and left-handed twist blades 322 mutually overlap in a twist axis (center axis in longitudinal direction) 323 direction.

Referring to FIG. 2, the top end in the diagram of the cylindrical body 31 has formed at the interior a hole (not shown) that passes through the tubular body 31. A fluoroplastic connector 33 having a male threaded portion 331 is attached thereto and, in this state, is inserted into the connecting hole 213 having female threaded portion 213a and secured to the main body 21 by screw fastening.

Figure 5:
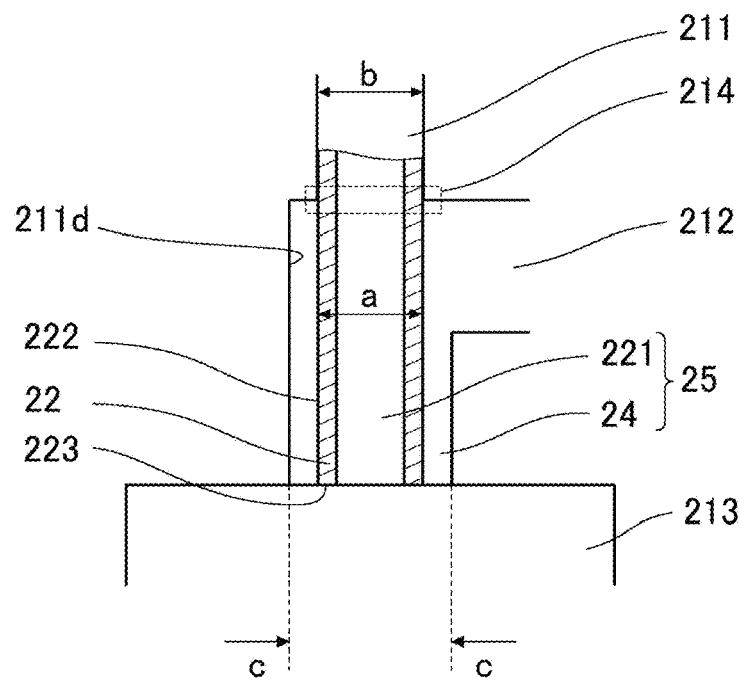
FIG. 5 is an enlarged sectional view of the double tube portion in FIG. 4.
Figure 6:
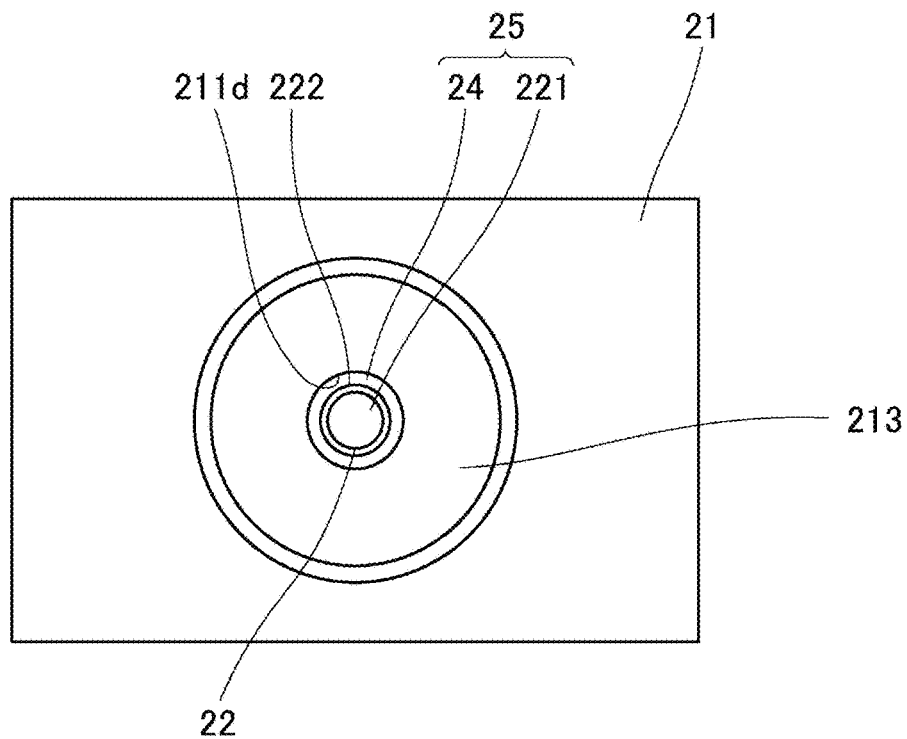
FIG. 6 is a bottom view of the main body in the inner tube-inserted state.

Next, the internal structure of the mixer for mixing two liquids having the above configuration is described while referring to FIGS. 4 to 6. As mentioned above, the diameter of the insertion hole 211, specifically the inside diameter b of the inner tube passage 211c in the vicinity of the connecting portion 214 with the feed port 212, is made substantially the same as the outside diameter a of the inner tube 22. Also, the inside diameter c of the inner tube passage 211c from the connecting portion 214 between the insertion hole 211 and the feed port 212 to the tip 223 of the inner tube 22 on the static mixer member 3 side thereof is formed so as to be larger than the outside diameter a of the inner tube 22. A double tube 25 is thus formed by the inner side 221 of the inner tube 22 and the space defined by the outside wall 222 of the inner tube and the inside wall 211d of the insertion hole 211.

Also, the double tube 25 side endface of the tubular body 31 in the static mixer member 3 and the static mixer member 3 side endface of the double tube 25 are in touching contact. In this embodiment, as mentioned above, because the starting end of the element body 32 is flush with the double tube 25 side endface of the tubular body 31, the static mixer member 3 side endface of the double tube 25 and the starting end (top end in FIG. 4) of the element body 32 are also in touching contact.

Figure 8:
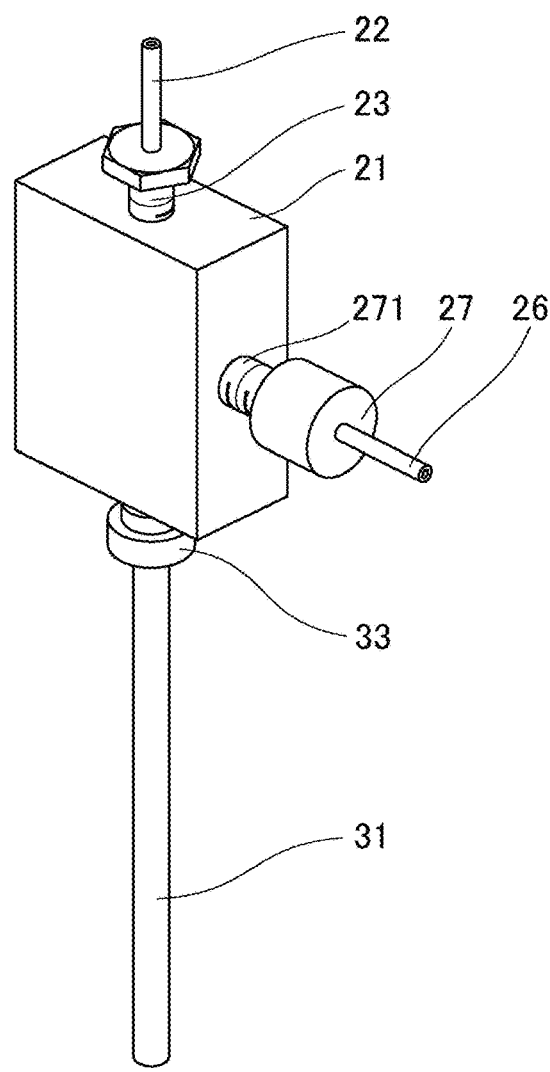
FIG. 8 is a perspective view showing an embodiment of the mixer for mixing two liquids that is used in the invention.

The second liquid is introduced from the feed port 212. In this case, as shown in FIG. 8, a feed tube 26 through which flows the second liquid is attached and connected by screw fastening to the feed port 212 using a connector 27 having formed therein a hole (not shown) through which passes the feed tube 26 and also having a sealing portion (not shown) for maintaining liquid tightness at the interior of the joint main body 21 and a male threaded portion 271.

Figure 9:
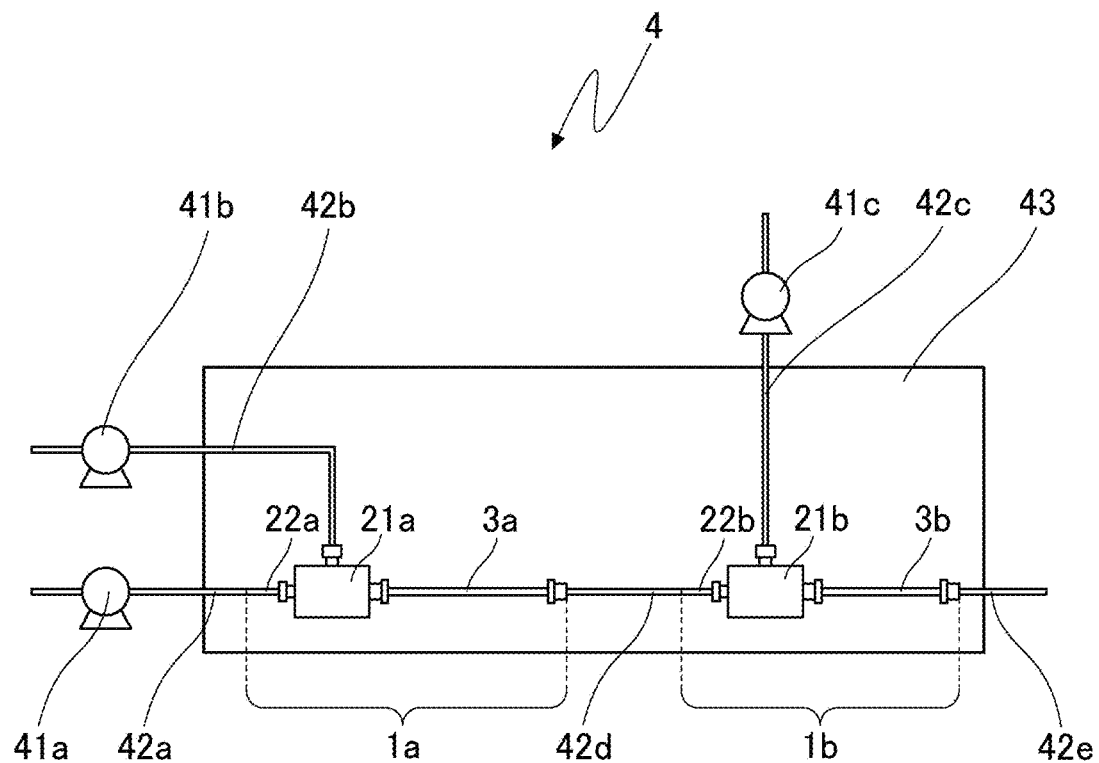
FIG. 9 is a schematic diagram showing an embodiment of the flow reactor used in the invention.

Next, an embodiment of a flow reactor which uses mixers for mixing two liquids configured as indicated above is described in conjunction with FIG. 9.

A flow reactor 4 has a construction in which a first mixer 1a for mixing two liquids and a second mixer 1b for mixing two liquids disposed at the interior of a thermostatic chamber 43 are connected in series via a PTFE tubing 42d (inside diameter, 1.5 mm).

A pump 41a for feeding a first liquid is connected to the inner tube 22a of the first mixer 1a via a PTFE tubing 42a (inside diameter, 1.0 mm). A pump 41b for feeding a second liquid is connected to a feed port provided in a main body 21a of a joint member in the first mixer 1a via a PTFE tubing 42b (inside diameter, 1.0 mm) through which flows the second liquid and which is provided at the tip thereof with a connector.

A pump 41c for feeding a third liquid is connected to a feed port in the second mixer 1b via a PTFE tubing 42c (inside diameter, 1.0 mm) through which flows the third liquid and which has a connector provided at the tip thereof, and a PTFE tubing 42e (inside diameter, 1.5 mm) is connected to the far end of the static mixer member 3b of the second mixer 1b.

In the flow reactor 4 having such a construction, the respective liquids fed from the first liquid-feeding pump 41a and the second liquid-feeding pump 41b flow into the joint member main body 21a of the first mixer 1a for mixing two liquids and pass through the double tube constructed at the interior thereof, following which they flow into the static mixer member 3a that is in touching contact with an end of this double tube and, as the liquids are being mixed and agitated by the element body at the interior thereof, a first reaction arises. A first reaction mixture following the reaction passes through tubing 42d, following which it passes through an inner tube 22b in the second mixer 1b for mixing two liquids and flows into a joint member main body 21b. This first reaction mixture, together with a third liquid that is fed from a third liquid-feeding pump 41c and flows into the interior of the joint member main body 21b, passes through a double tube at the interior of the joint member main body 21b and, as in the case of the first mixer 1a for mixing two liquids, flows into the interior of the static mixer member 3b, where a second reaction proceeds.

The mixers for mixing two liquids and the flow reactor that are used in this invention are not limited to the above-described embodiments. Modifications and improvements may be carried out within a range where the objects and advantageous effects of the invention can be achieved.

That is, in the above-described mixer 1 for mixing two liquids, the inner tube 22 and the static mixer member 3 were removably screw fastened to the joint member main body 21. However, these may be removably arranged by another attaching means or, alternatively, may be connected and fastened in a non-removable state.

Also, discrete connectors 23 and 33 were provided for the inner tube 22 and the tubular body 31. However, instead of providing such discrete connectors, suitable attaching means may be formed in the inner tube and the tubular body themselves.

In addition, a feed port 212 was formed in the joint member main body 21 in an embodiment that connects with the insertion hole 211 at a right angle, although an embodiment in which it connects to the insertion hole at another angle is also acceptable. The feed port 212 position also can be set anywhere.

The material making up the main body 21, inner tube 22 and connector 23 was stainless steel but is not limited to this, and may instead be another metal such as titanium, iron, copper, nickel or aluminum, or may be a resin such as PTFE, FEP, PFA, PEEK or PP.

The inside diameter of the inner tube 22 may be suitably set according to the intended purpose within a range that does not detract from the advantageous effects of the invention, although normally the inside diameter is preferably from about 0.1 mm to about 3 mm, more preferably from about 0.5 mm to about 2 mm, and even more preferably from about 0.5 mm to about 1 mm. The outside diameter of the inner tube 22 may be suitably set according to the intended purpose within a range that does not detract from the advantageous effects of the invention, although normally the outside diameter is preferably from about 0.8 mm to about 4 mm, more preferably from about 0.8 mm to about 3 mm, and even more preferably from about 0.8 mm to about 1.6 mm.

The diameter c of the insertion hole 211 may be suitably set according to the intended purpose within a range that does not detract from the advantageous effects of the invention, although normally the inside diameter is preferably from about 0.1 mm to about 5 mm, more preferably from about 0.5 mm to about 4 mm, and even more preferably from about 0.8 mm to about 2 mm.

The material making up the tubular body 31 is not limited to stainless steel, and may be another metal such as titanium, iron, copper, nickel or aluminum, or a resin such as PTFE, FEP, PFA, PEEK or PP.

The material making up the element body 32 is not limited to polyacetal, and may be another resin such as PTFE, FEP, PFA, PEEK or PP, a metal such as stainless steel, titanium, iron, copper, nickel or aluminum, or a ceramic.

The shape of the element body 32 may alternatively be a helical shape with a fixed direction of twist, or the element body 32 may be one in which are stacked a plurality of plates each provided with one, two or more holes.

The material making up the connector 33 is not limited to a fluoroplastic, and may be another resin such as PEEK or PP, or a metal such as stainless steel, titanium, iron, copper, nickel or aluminum.

The inside diameter of the tubular body 31 may be suitably set according to the intended purpose within a range that does not detract from the advantageous effects of the invention, although normally the inside diameter is preferably from about 1 mm to about 10 mm, more preferably from about 1.6 mm to about 8 mm, and even more preferably from about 2 mm to about 5 mm. The diameter of the element body 32 also may be suitably set according to the intended purpose within a range that does not detract from the advantageous effects of the invention, although normally this diameter is preferably from about 1 mm to about 10 mm, more preferably from about 1.6 mm to about 8 mm, and even more preferably from about 2 mm to about 5 mm.

Because the flow reactor 4 is equipped with two mixers for mixing two liquids, two-stage flow synthesis is possible. However, in cases where single-stage flow synthesis is carried out, a single mixer for mixing two liquids may be used. In cases where n-stage flow synthesis is carried out, the flow reactor should be assembled in the above-described manner using n number of mixers for mixing two liquids.

The inside diameters of tubings 42a to 42e in the flow reactor 4 may be suitably set according to the intended purpose within a range that does not detract from the advantageous effects of the invention, although normally the inside diameter is preferably from about 0.5 mm to about 10 mm, more preferably from about 0.7 mm to about 4 mm, and even more preferably from about 1 mm to about 2 mm. The length also may be suitably set according to the intended purpose within a range that does not detract from the advantageous effects of the invention, although normally the length is preferably from about 0.1 m to about 20 m, more preferably from about 0.2 m to about 10 m, and even more preferably from about 0.3 m to about 5 m.

[Polymer Production Method]

The monomer is introduced into the flow reactor in the state of a liquid. At this time, it is preferable for the monomer to be introduced from the feed port in the mixer for mixing two liquids. By being thus introduced, clogging of the flow reactor does not readily arise, pressure loss is suppressed and the polymer can be stably produced over a long period of time.

The solvent that dissolves the monomer is not particularly limited. Preferred examples include ethers such as tetrahydrofuran (THF), 2-methyl THF, diethyl ether, tetrahydropyran (THP), oxepane and 1,4-dioxane; and also toluene, dichloromethane and diethoxyethane.

The monomer concentration is not particularly limited and may be suitably set according to the intended purpose, although the concentration is preferably from 0.1 to 5 mol/L, more preferably from 0.1 to 3 mol/L, and even more preferably from 0.5 to 2 mol/L. So long as the monomer concentration is in this range, clogging of the flow reactor does not readily arise, pressure loss is suppressed, and the polymer can be stably produced over a long period of time.

The flow rate of the monomer that flows through the flow channel in the flow reactor is not particularly limited and may be suitably set according to the intended purpose. The flow rate is preferably from 1 to 30 mL/min, more preferably from 5 to 20 mL/min, and even more preferably from 10 to 20 mL/min. So long as the monomer flow rate is in this range, clogging of the flow reactor does not readily arise, pressure loss is suppressed and the polymer can be stably produced over a long period of time.

The initiator is introduced into the flow reactor in a liquid state. At this time, the initiator is preferably introduced from the inner tube of the mixer for mixing two liquids. By being thus introduced, clogging of the flow reactor does not readily arise, pressure loss is suppressed and the polymer can be stably produced over a long period of time.

In the polymer production method of the invention, it is especially preferable to use n-butyllithium as the initiator. When anionic polymerization is carried out in a polar solvent (e.g., THF), the rate of polymerization is rapid and so the reaction is generally carried out at a low temperature. Hence, a drawback is that, unless sec-butyllithium is used as the initiator, the initiation reaction may not proceed as desired. On the other hand, when anionic polymerization is carried out in a nonpolar solvent (e.g., toluene), the reaction rate is slow and heating is required. In this case, n-butyllithium, which has a low reactivity, is sometimes used as the initiator. The inventive polymer production method using a flow reactor, because reaction at close to room temperature is possible within a polar solvent, has the advantage of enabling the use of low-reactivity n-butyllithium as the initiator.

The solvent that dissolves the initiator is not particularly limited. Preferred examples include ethers such as hexane, tetrahydrofuran (THF), 2-methyl THF, diethyl ether, tetrahydropyran (THP), oxepane and 1,4-dixoane; and also toluene, dichloromethane, diethoxyethane, toluene and diethyl ether.

The initiator concentration is not particularly limited, and may be suitably set according to the type of monomer. The concentration is preferably from 0.01 to 0.5 mol/L, more preferably from 0.03 to 0.3 mol/L, and even more preferably from 0.05 to 0.1 mol/L. At an initiator concentration in this range, clogging of the flow reactor does not readily arise, pressure loss is suppressed and the polymer can be stably produced over a long period of time.

The flow rate of the initiator flowing through the flow reactor flow channel is not particularly limited, and may be suitably set according to the intended object. The flow rate is preferably from 0.1 to 10 mL/min, more preferably from 0.5 to 5 mL/min, and even more preferably from 1 to 3 mL/min. At an initiator flow rate in this range, clogging of the flow reactor does not readily arise, pressure loss is suppressed and the polymer can be stably produced over a long period of time.

When a flow reactor having two mixers for mixing two liquids, such as above-described flow reactor 4, is used, a block copolymer can be synthesized. In this case, it is preferable to introduce a second monomer from the feed port of the second mixer. Similarly, when a flow reactor having n number of mixers for mixing two liquids is used, a block copolymer having a maximum of n number of monomer units can be synthesized. The monomer type and concentration, and the flow rate of monomer passing through the flow channel in the flow reactor, are the same as described above.

The reaction temperature (flow reactor temperature) in the production method of the invention is not particularly limited and may be suitably set according to the desired object. From the standpoint of the reaction rate, the temperature is preferably −80° C. or higher, more preferably −40° C. or higher, and even more preferably −20° C. or higher. From the standpoint of suppressing side reactions and suppressing deactivation of the growing end of the polymer, the reaction temperature is preferably not more than 100° C., more preferably not more than 50° C., and even more preferably not more than 30° C.

Examples of methods for terminating the reaction include the method of collecting, in a vessel containing an excess amount of a reaction terminator such as methanol, the polymerization reaction solution that has exited the flow reactor; and the method of including two or more of the above mixers for mixing two liquids in the flow reactor and having a reaction terminator such as methanol flow from one side of the final mixer for mixing two liquids.

With the production method of the invention, a polymer having a small dispersity Mw/Mn (a narrow molecular weight distribution) can be synthesized. The dispersity is preferably not more than 1.5, more preferably not more than 1.3, even more preferably not more than 1.2, and still more preferably not more than 1.15. Mw and Mn respectively represent the weight-average molecular weight and number-average molecular weight, these being polystyrene equivalent measured values obtained by gel permeation chromatography (GPC). The Mw of the polymer obtained by the production method of the invention, although not particularly limited, is preferably from 1,000 to 100,000, and more preferably from 1,000 to 50,000.

[Polymer]

The polymer obtained by the polymer production method of the invention includes structural units of formula (1) below

[Chem. 4]

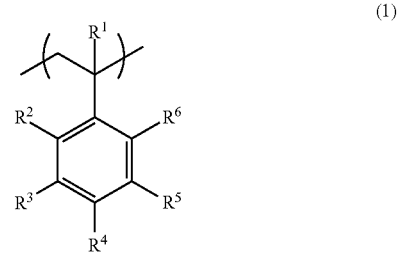

(1)

(in the formula, $R^1$ to $R^6$ are the same as above) and has an end that is an n-butyl group from an initiator residue, a weight-average molecular weight (Mw) of from 1,000 to 50,000, and a dispersity of 1.5 or less.

Such a polymer can be produced by, in the above-described polymer production method, using the above-described styrene derivative as the monomer and using n-butyllithium as the initiator.

The polymer production method of the invention is particularly suitable for producing a block copolymer that includes a first polymer block containing structural units of formula (2) below and a second polymer block containing structural units of formula (3) below

[Chem. 5]

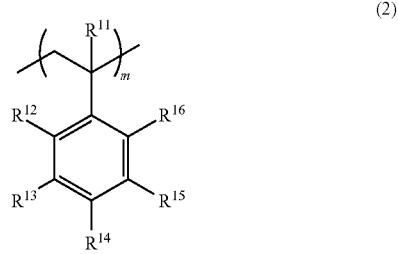

(2)

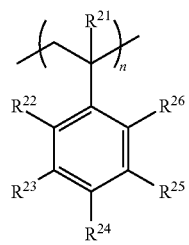

(3)

wherein the structural units of formula (2) and the structural units of formula (3) are mutually differing structural units and the polymer has an end that is an n-butyl group from an initiator residue, a weight-average molecular weight (Mw) of from 1,000 to 50,000, and a dispersity of 1.5 or less.

In the above formulas, $R^{11}$ and $R^{21}$ are each independently a hydrogen atom or a methyl group; $R^{12}$ to $R^{16}$ are each independently a hydrogen atom, an alkoxy group of 1 to 5 carbon atoms or an alkyl group of 1 to 10 carbon atoms which may be substituted with a halogen atom; $R^{22}$ to $R^{26}$ are each independently $-OSiR^{27}_3$ or $-SiR^{27}_3$; each $R^{27}$ is independently an alkyl group of 1 to 10 carbon atoms, a phenyl group, an alkoxy group of 1 to 5 carbon atoms or an alkylsilyl group of 1 to 5 carbon atoms; and m and n represent the number of respective structural units, each being independently an integer from 1 to 480. The alkyl group, alkoxy group and halogen atom are exemplified in the same way as described above.

$R^{14}$ is preferably an alkoxy group of 1 to 5 carbon atoms, and more preferably a methoxy group. $R^{24}$ is preferably $-SiR^{27}_3$, and more preferably $-Si(CH_3)_3$. $R^{12}$, $R^{13}$, $R^{15}$, $R^{16}$, $R^{22}$, $R^{23}$, $R^{25}$ and $R^{26}$ are each preferably a hydrogen atom, an alkyl group of 1 to 10 carbon atoms, an alkoxy group of 1 to 5 carbon atoms or $-SiR^7_3$; and more preferably a hydrogen atom, a methoxy group or $-Si(CH_3)_3$.

In the above-described block copolymer, the first polymer block is preferably one containing only structural units of formula (2), and the second polymer block is preferably one containing only structural units of formula (3). The block copolymer is preferably one containing only the first polymer blocks and the second polymer blocks.

In the above-described block copolymer, the content ratio of the first polymer blocks and the second polymer blocks, expressed in terms of the molar ratio, is preferably from 1:1 to 1:10, and more preferably from 1:1 to 1:3.

This block copolymer can be produced by using, as the monomers in the above-described polymer production method, a monomer that gives structural units of formula (1) and a monomer that gives structural units of formula (2), using n-butyllithium as the initiator, and using a flow reactor having two or more mixers for mixing two liquids.

EXAMPLES

Synthesis Examples, Working Examples and Comparative Examples are given below to more concretely illustrate the invention, although the invention is not limited by these Examples.

Figure 10:
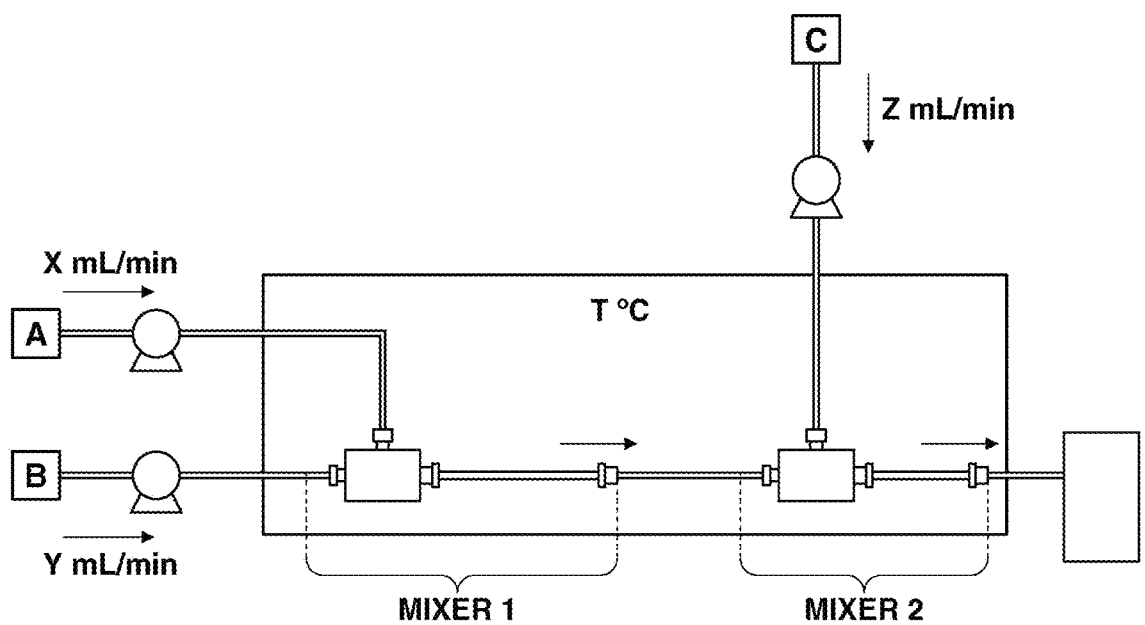
FIG. 10 is a schematic diagram showing the construction of the flow reactor used in the Working Examples.

FIG. 10 shows a schematic view of the flow reactor used in the Working Examples and Comparative Examples described below. In FIG. 10, the arrows indicate the direction of liquid flow. A plunger pump (KP-12 or HP-12, from Flom K.K.) was used for feeding liquid A, and PTFE tubing (inside diameter, 1.0 mm; outside diameter, 1.6 mm; length, 2 m) was used to connect the plunger pump and Mixer 1. A syringe pump 1 (Keychem-L, from YMC Co., Ltd.; Working Examples 1 to 7) or a diaphragm pump 1 (Smoothflow-Q, from Tacmina Corporation; Working Examples 8 to 10) was used for feeding liquid B, and PTFE tubing (inside diameter, 1.0 mm; outside diameter, 1.6 mm; length, 2 m) was used to connect the syringe pump 1 and Mixer 1. The Mixer 1 outlet and an inlet to Mixer 2 were connected by PTFE tubing 1 (inside diameter, 1.5 mm; outside diameter, 3 mm; length: 2 m (Working Examples 1-4 and 7), 5 m (Working Examples 5 and 6), 1.3 m (Comparative Example 1) or 0.7 m (Comparative Example 2)) or PFA tubing 1 (inside diameter, 2 mm; outside diameter, 3 mm; length, 1 m (Working Examples 8 to 10)). The other Mixer 2 inlet was connected to a syringe pump (Asia, from Syrris Ltd.) for feeding liquid C by PTFE tubing (inside diameter, 1.0 mm; outside diameter, 1.6 mm; length, 2 m). PTFE tubing 2 (inside diameter, 1.5 mm; outside diameter, 3 mm; length: 2 m (Working Examples 1 to 7), 1.3 m (Comparative Example 1) or 0.7 m (Comparative Example 2)) or PFA tubing 2 (inside diameter, 2 mm; outside diameter, 3 mm; length, 0.7 m (Working Examples 8 to 10)) was connected to the Mixer 2 outlet. Liquids A, B and C were made to flow into the reactor at respective flow rates X, Y and Z (mL/min), thereby effecting the reaction, and the effluent was analyzed by gel permeation chromatography (GPC). The flow channels downstream of the respective pumps and up to nine-tenths of the length of the tubing 2 were immersed in a thermostatic chamber at T° C. and the temperature was regulated. The pressure sensor log for the fluid A pump was set to indicate the pressure trend.

The GPC measurement conditions were as follows.

Column: PLgel 3 μm MIXED-E (Agilent Technologies)

Mobile phase: tetrahydrofuran (THF)

Flow rate: 1.0 mL/min

Column oven: 40° C.

Detector: UV detector

Dose: polystyrene standard

The $^1$H-NMR (300 MHz) measurement conditions were as follows.

Measurement solvent: heavy chloroform

Reference substance: tetramethylsilane (TMS) (δ 0.0 ppm)

Table 1 shows collectively, for Working Examples 1 to 10 and Comparative Examples 1 and 2, the compositions of liquids A to C and their flow rates X to Z (mL/min), as well as the temperature T (° C.) of the thermostatic chamber.

TABLE 1

|  |  | Liquid A | X (mL/min) | Liquid B | Y (mL/min) | Liquid C | Z (mL/min) | T (° C.) |
|---|---|---|---|---|---|---|---|---|
| Working Example | 1 | 2.0 mol/L styrene/THF | 10 | 0.11 mol/L sec-butyllithium/hexane | 2 | 0.25 mol/L MeOH/THF | 10 | 5 |
|  | 2 | 0.5 mol/L 4-methoxystyrene/THF | 10 | 0.06 mol/L sec-butyllithium/hexane | 2 | 0.25 mol/L MeOH/THF | 10 | 5 |
|  | 3 | 0.5 mol/L 4-methoxystyrene/THF | 10 | 0.1 mol/L n-butyllithium/hexane | 2 | 0.25 mol/L MeOH/THF | 10 | 5 |
|  | 4 | 0.65 mol/L 4-trimethylsilylstyrene/THF | 5 | 0.05 mol/L n-butyllithium/hexane | 2 | 0.25 mol/L MeOH/THF | 5.5 | 5 |
|  | 5 | 0.5 mol/L 4-methoxystyrene/THF | 10 | 0.05 mol/L n-butyllithium/hexane | 2 | 0.65 mol/L 4-trimethylsilylstyrene/THF | 5 | 5 |
|  | 6 | 0.5 mol/L 4-methoxystyrene/THF | 10 | 0.05 mol/L n-butyllithium/hexane | 2 | 0.25 mol/L MeOH/THF | 5.5 | 5 |
|  | 7 | 2.0 mol/L styrene/THF | 10 | 0.11 mol/L n-butyllithium/hexane | 2 | 0.25 mol/L MeOH/THF | 10 | −20 |
|  | 8 | 1.0 mol/L styrene/THF | 30 | 0.10 mol/L n-butyllithium/hexane | 6 | 0.50 mol/L MeOH/THF | 10 | 0 |
|  | 9 | 1.0 mol/L styrene/THF | 40 | 0.10 mol/L n-butyllithium/hexane | 8 | 0.50 mol/L MeOH/THF | 10 | 0 |
|  | 10 | 0.65 mol/L 4-trimethylsilylstyrene/THF | 30 | 0.10 mol/L n-butyllithium/hexane | 6 | 0.50 mol/L MeOH/THF | 10 | 0 |
| Comparative Example | 1 | 1.0 mol/L 4-methoxystyrene/THF | 5 | 0.11 mol/L sec-butyllithium/hexane | 1 | 0.25 mol/L MeOH/THF | 6.3 | 5 |
|  | 2 | 2.0 mol/L styrene/THF | 5 | 0.1 mol/L sec-butyllithium/hexane | 1 | 0.25 mol/L MeOH/THF | 6.1 | −20 |

Working Example 1

The reaction was carried out under the conditions in Table 1. The joint member 2 used in Mixer 1 was made of stainless steel and the tubular body 31 was made of fluoroplastic. The static mixer element body consisted of DSP-MX3-17 polyacetal elements from Noritake Company Ltd. (17 twist blades; diameter 3 mm) that were modified by joining three such elements together to bring the number of twist blades to 51. Mixer 2 was made of the same materials as Mixer 1, and modified DSP-MXA3-17 elements were used as the static mixer element body here too. The liquid A tubing was connected to the feed port inlet on Mixer 1, and the liquid B tubing was connected to the inner tube inlet.

The liquid C tubing was connected to the feed port inlet on Mixer 2, and Tubing 1 was connected to the inner tube inlet. Unless noted otherwise, the same manner of connection was used below in the other Examples. After 10 minutes of liquid feeding, the effluent was collected for one minute. This effluent was analyzed by GPC, whereupon Mn=14,313 and Mw/Mn=1.15.

Figure 11:
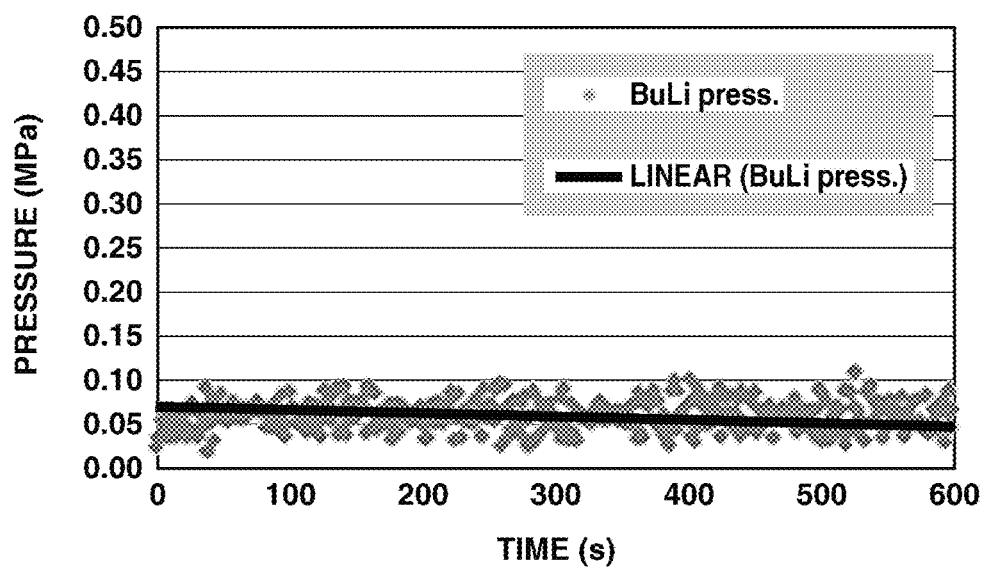
FIG. 11 is a graph showing the pressure trend during the reaction in Working Example 1.

FIG. 11 shows the pressure trend during the reaction. There were substantially no pressure fluctuations over 10 minutes.

Working Example 2

The reaction was carried out under the conditions in Table 1. The same materials as in Working Example 1 were used for Mixer 1. In the static mixer member, an element body having 68 twist blades obtained by modifying and joining together four DSP-MXA3-17 elements and an element body having 51 twist blades obtained by modifying and joining together three DSP-MXA3-17 elements were connected in series and used. Mixer 2 was the same as that used in Working Example 1. After 20 minutes of liquid feeding, the effluent was collected for one minute. This effluent was analyzed by GPC, whereupon Mn=6,327 and Mw/Mn=1.08.

Figure 12:
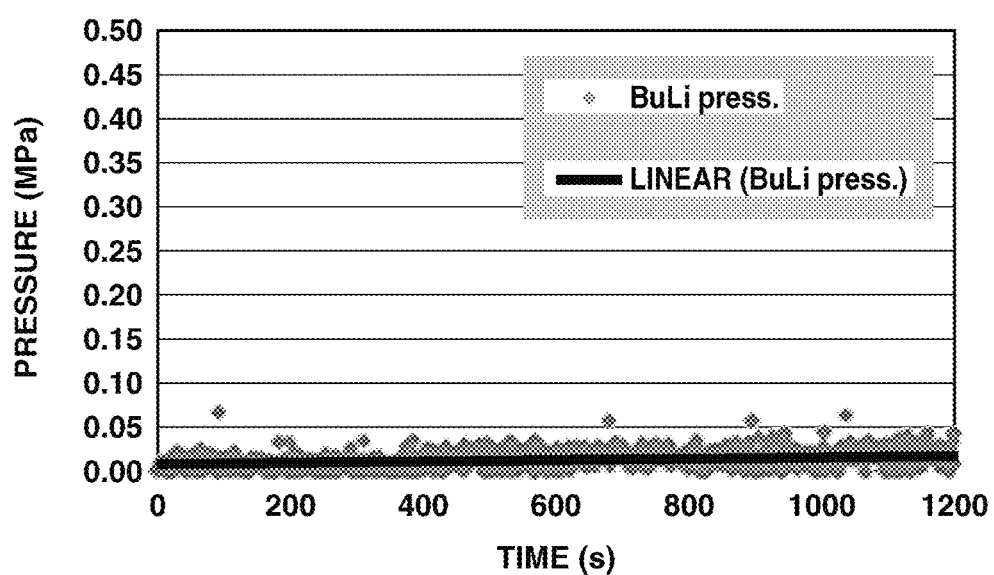
FIG. 12 is a graph showing the pressure trend during the reaction in Working Example 2.

FIG. 12 shows the pressure trend during the reaction. There were substantially no pressure fluctuations over 20 minutes.

Working Example 3

The reaction was carried out under the conditions in Table 1. The same materials as in Working Example 2 were used for Mixers 1 and 2. After 15 minutes of liquid feeding, the effluent was collected for one minute. This effluent was analyzed by GPC, whereupon Mn=4,026 and Mw/Mn=1.07.

Figure 13:
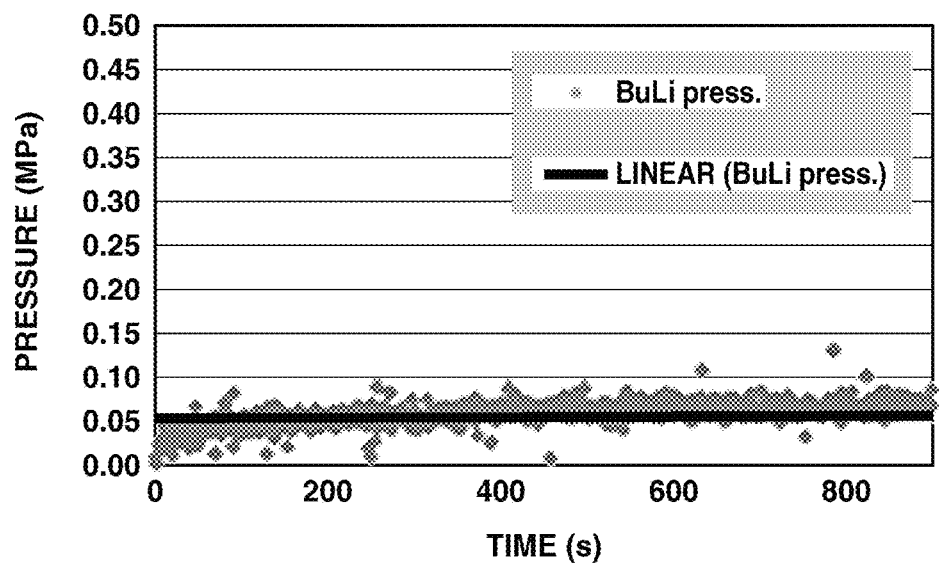
FIG. 13 is a graph showing the pressure trend during the reaction in Working Example 3.

FIG. 13 shows the pressure trend during the reaction. There were substantially no pressure fluctuations over 15 minutes.

Working Example 4

The reaction was carried out under the conditions in Table 1. The same materials as in Working Example 1 were used for Mixer 1. In the static mixer member, an element body having 68 twist blades obtained by modifying and joining together four DSP-MXA3-17 elements was used. Mixer 2 was the same as that used in Working Example 2. After 10 minutes of liquid feeding, the effluent was collected for one minute. This effluent was analyzed by GPC, whereupon Mn=9,857 and Mw/Mn=1.34.

Figure 14:
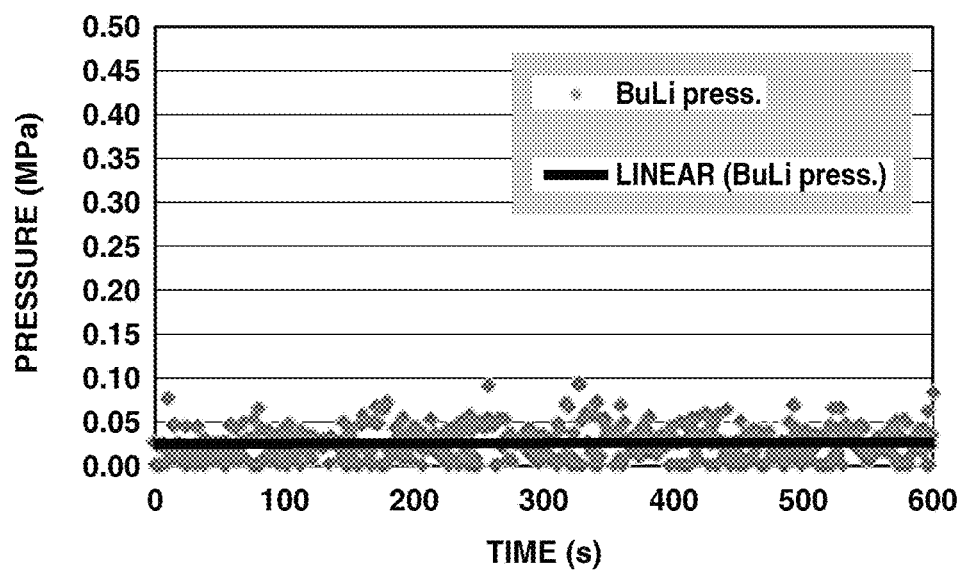
FIG. 14 is a graph showing the pressure trend during the reaction in Working Example 4.

FIG. 14 shows the pressure trend during the reaction. There were substantially no pressure fluctuations over 10 minutes.

Working Example 5

The reaction was carried out under the conditions in Table 1. The same materials as in Working Example 2 were used for Mixers 1 and 2. After 20 minutes of liquid feeding, the effluent was collected for one minute while adding dropwise 10 mL of a 0.25 mol/L methanol/THF solution. This effluent was analyzed by GPC, whereupon Mn=20,343 and Mw/Mn=1.15.

Figure 15:
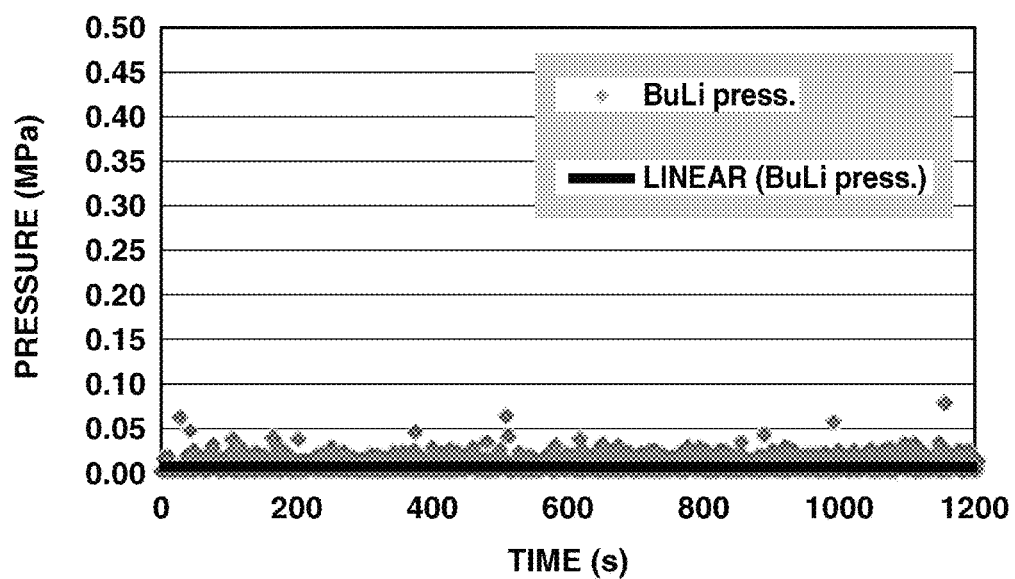
FIG. 15 is a graph showing the pressure trend during the reaction in Working Example 5.

FIG. 15 shows the pressure trend during the reaction. There were substantially no pressure fluctuations over 20 minutes.

Figure 16:
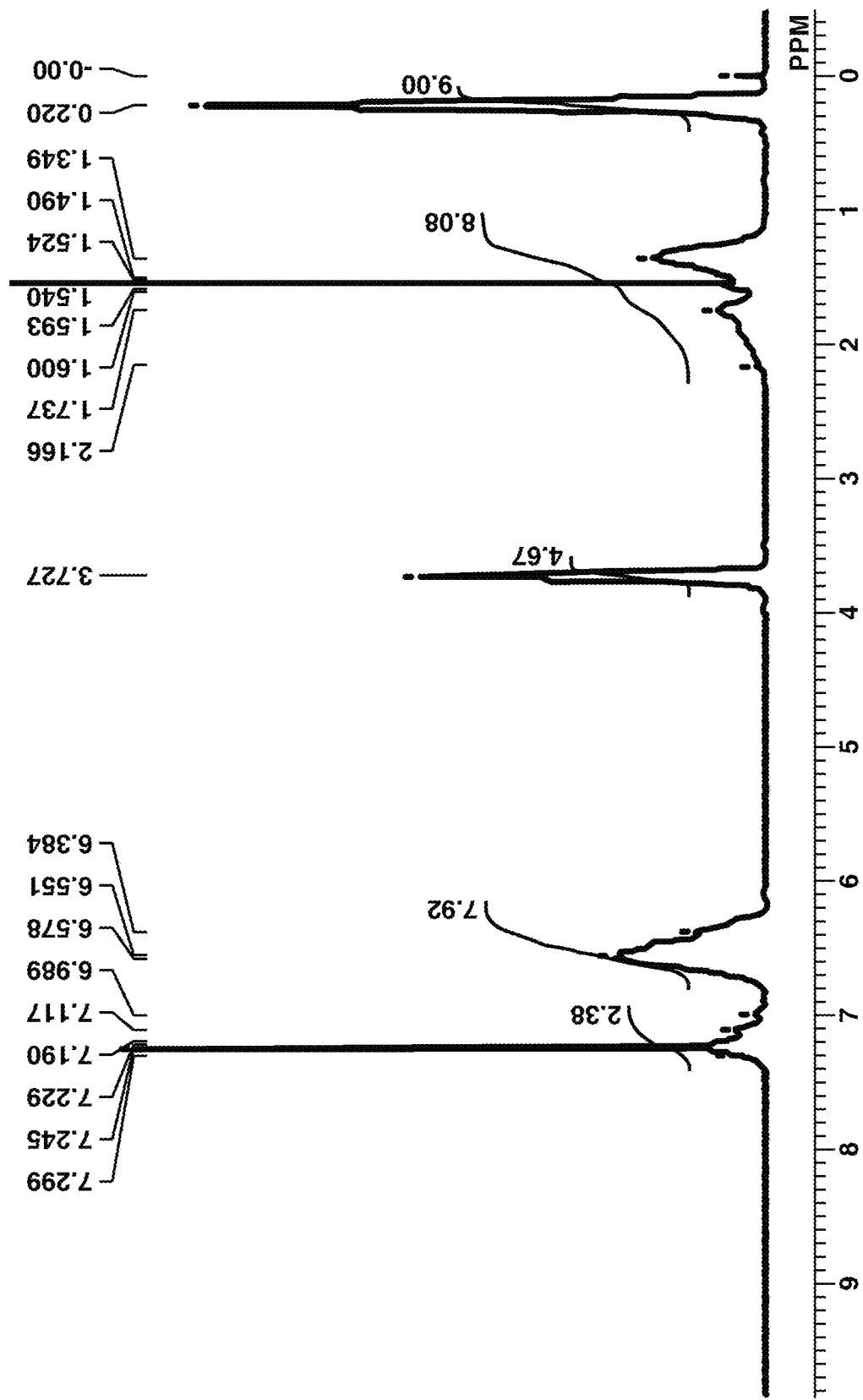
FIG. 16 is a $^1$H-NMR chart of the polymer produced in Working Example 5.

In addition, the solvent was driven off with an evaporator from 308 g of the effluent, bringing the volume down to 125 g, after which 501 g of methanol was added dropwise at room temperature. The resulting white suspension was filtered with filter paper (No. 5B from Kiriyama Glass Co.) and then washed with 153 g of methanol. Next, the resulting white solid was vacuum dried (50° C., 2.5 hours), giving 16 g of polymethoxystyrene-b-polytrimethylsilylstyrene block copolymer. FIG. 16 shows the $^1$H-NMR chart of the resulting polymer.

Working Example 6

The reaction was carried out under the conditions in Table 1. Aside from the tubular body 31 of Mixer 1 being made of stainless steel, the other members thereof and Mixer 2 were the same as those used in Working Example 2. After 20 minutes of liquid feeding, the effluent was collected for one minute. This effluent was analyzed by GPC, whereupon Mn=10,700 and Mw/Mn=1.10.

Figure 17:
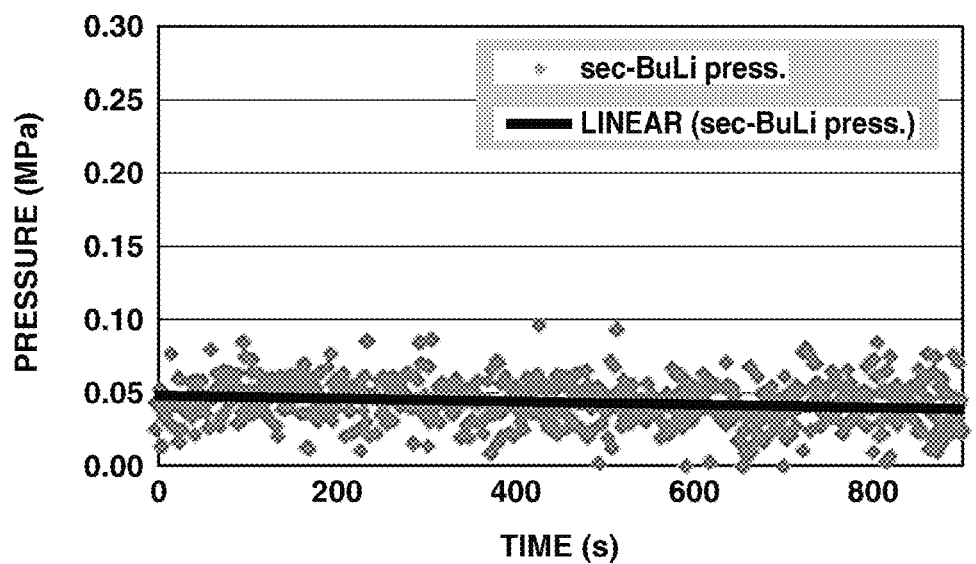
FIG. 17 is a graph showing the pressure trend during the reaction in Working Example 6.

FIG. 17 shows the pressure trend during the reaction. There were substantially no pressure fluctuations over 15 minutes.

Working Example 7

The reaction was carried out under the conditions in Table 1. Aside from the tubular bodies 31 of Mixers 1 and 2 being made of stainless steel, the other members were the same as those used in Working Example 1. After 15 minutes of liquid feeding, the effluent was collected for one minute. This effluent was analyzed by GPC, whereupon Mn=11,544 and Mw/Mn=1.15. There were substantially no pressure fluctuations over 15 minutes.

Working Example 8

The reaction was carried out under the conditions in Table 1. In Mixer 1, the same materials were used as in Working Example 1. In Mixer 2, an ordinary simple double-tube mixer was used. After 3 minutes of liquid feeding, the effluent was collected for 0.5 minute. This effluent was analyzed by GPC, whereupon Mn=5,979 and Mw/Mn=1.08.

Working Example 9

The reaction was carried out under the conditions in Table 1. In Mixer 1, the same materials were used as in Working Example 1. In Mixer 2, an ordinary simple double-tube mixer was used. After 3.5 minutes of liquid feeding, the effluent was collected for 0.5 minute. This effluent was analyzed by GPC, whereupon Mn=5,956 and Mw/Mn=1.09.

Working Example 10

The reaction was carried out under the conditions in Table 1. In Mixer 1, the same materials were used as in Working Example 1. In Mixer 2, the same materials were used as in Working Example 8. After 3.5 minutes of liquid feeding, the effluent was collected for 0.5 minute. This effluent was analyzed by GPC, whereupon Mn=6,566 and Mw/Mn=1.09.

Comparative Example 1

The reaction was carried out under the conditions in Table 1. A T-mixer (from Sanko Seiki Kogyo KK; made of stainless steel; inside diameter, 0.25 mm) was used as Mixer 1. The respective pumps were connected so that liquid A and liquid B meet at 180°. A T-mixer (from Sanko Seiki Kogyo KK; made of stainless steel; inside diameter, 1.0 mm) was used as Mixer 2. The respective pumps were connected so that the liquid that emerges from Mixer 1 and liquid C meet at 180°.

Figure 18:
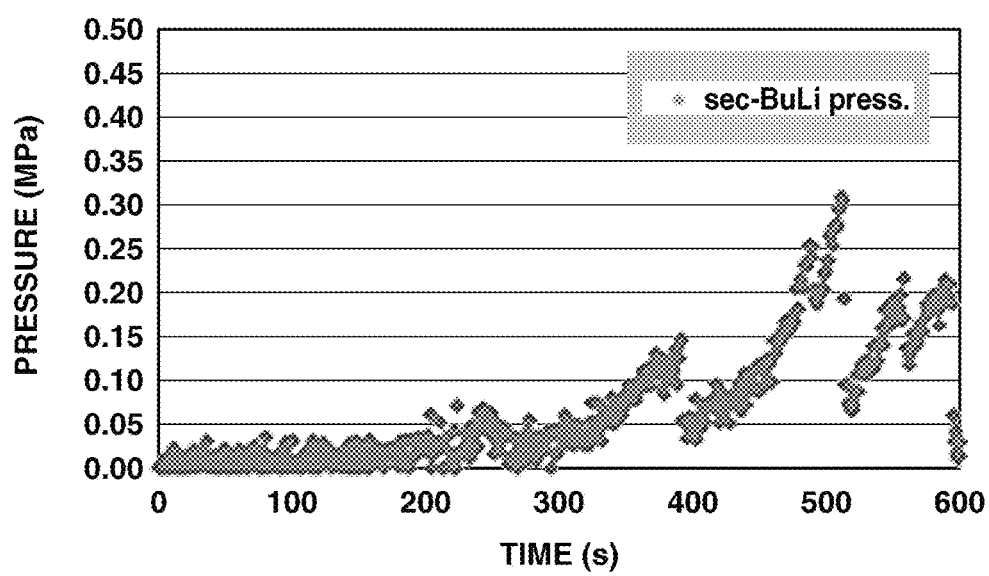
FIG. 18 is a graph showing the pressure trend during the reaction in Comparative Example 1.

FIG. 18 shows the pressure trend during the reaction. Sudden pressure fluctuations are apparent starting about 5 minutes after liquid feeding.

Comparative Example 2

The reaction was carried out under the conditions in Table 1. Comet X-01 mixers (stainless steel mixers from Techno-Applications KK) were used as Mixers 1 and 2. In Mixer 1, the liquid A tubing was connected to the inlet side of the outer tube, and the liquid B tubing was connected to the inner tube inlet. In Mixer 2, the liquid C tubing was connected to the inlet side of the outer tube, and Tubing 1 was connected to the inner tube inlet.

Figure 19:
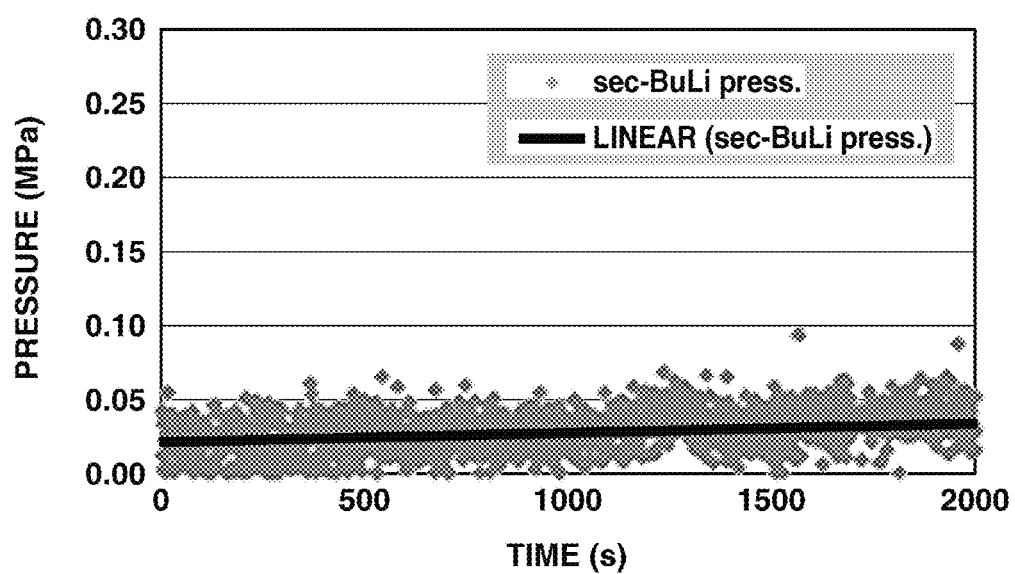
FIG. 19 is a graph showing the pressure trend during the reaction in Comparative Example 2.

FIG. 19 shows the pressure trend after 35 minutes of liquid feeding. Some pressure fluctuation and a rise in pressure over time are apparent.

As demonstrated above, with the polymer production method of the invention, clogging of the flow channels in the flow reactor did not readily occur, as a result of which pressure fluctuations were not observed and the polymer was stably produced over a long period of time.

REFERENCE SIGNS LIST

1 Mixer for mixing two liquids
2 Joint member
21 Main body
211 Insertion hole
212 Feed port
213 Connecting hole
22 Inner tube
221 Inner side of inner tube
222 Outer wall of inner tube
223 Inner tube tip
24 Space
25 Double tube
3 Static mixer member
31 Tubular body
32 Element body
321 Right-handed twist blade
322 Left-handed twist blade
4 Flow reactor

The invention claimed is:

1. A polymer production method comprising the step of anionically polymerizing a monomer in the presence of an initiator by using a flow reactor having a flow channel capable of mixing a plurality of liquids,
    wherein the flow reactor is equipped with a mixer for mixing two liquids, and
    the mixer for mixing two liquids comprises a joint member having a double tube at the interior and a static mixer member.

2. The polymer production method of claim 1,
    the static mixer member comprises a tubular body and an element body inserted at the interior of the tubular body; and
    the joint member and the static mixer member are connected in such manner that a double tube side end face of the tubular body is in touching contact with a static mixer member side end face of the double tube.

3. The polymer production method of claim 2, wherein the static mixer member side end of the double tube is situated at the interior of the joint member.

4. The polymer production method of claim 1, wherein the joint member has an insertion hole for inserting an inner tube through which flows an initiator solution and, in the inner tube-inserted state, the double tube is formed of, at least near a tip of the inner tube, the inner side of the inner tube and the space defined by an outer wall of the inner tube and an inner wall of the insertion hole.

5. The polymer production method of claim 4, wherein the joint member has a feed port for introducing a monomer solution, which feed port is connected to the insertion hole.

6. The polymer production method of claim 5, wherein the insertion hole is formed so as to have, in the vicinity of a connecting portion with the feed port, a diameter that is substantially the same as the inner tube outside diameter, and moreover is formed so as to have, from the place of connection to a tip of the inner tube, a diameter that is larger than the inner tube outside diameter.

7. The polymer production method of claim 4, wherein the joint member has a hole for connecting to the static mixer member and the feed port is connected to said connecting hole.

8. The polymer production method of claim 1, wherein the monomer is an aromatic vinyl compound.

9. The polymer production method of claim 1, wherein the initiator is an alkyllithium.

10. The polymer production method of claim 1, wherein the polymer has a dispersity of 1.5 or less.

11. A polymer production method comprising the step of anionically polymerizing a monomer in the presence of an initiator by using a flow reactor having a flow channel capable of mixing a plurality of liquids,
wherein the static mixer member comprises a tubular body and an element body inserted at the interior of the tubular body, and
the element body is inserted into the interior of the tubular body in such manner that one end of the element body is substantially flush with the double tube side end face of the tubular body.

12. The polymer production method of claim 11, wherein the element body has a shape in which a plurality of right-handed twist blades and left-handed twist blades mutually overlap in a twist axis direction.

* * * * *